United States Patent
Jeong et al.

(10) Patent No.: US 12,474,209 B2
(45) Date of Patent: Nov. 18, 2025

(54) SENSOR DEVICE AND SEMICONDUCTOR PROCESSING APPARATUS USING THE SAME

(71) Applicant: SAMSUNG ELECTRONICS CO., LTD., Suwon-si (KR)

(72) Inventors: Yunsong Jeong, Suwon-si (KR); Jawon Ko, Suwon-si (KR); Jongwha Lee, Suwon-si (KR); Taijo Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 18/510,461

(22) Filed: Nov. 15, 2023

(65) Prior Publication Data

US 2024/0377256 A1 Nov. 14, 2024

(30) Foreign Application Priority Data

May 8, 2023 (KR) .................. 10-2023-0059209

(51) Int. Cl.
*G01J 3/28* (2006.01)
*G01J 3/51* (2006.01)
*H01J 37/32* (2006.01)

(52) U.S. Cl.
CPC ............... *G01J 3/2823* (2013.01); *G01J 3/51* (2013.01); *H01J 37/32972* (2013.01); *H01J 2237/24585* (2013.01)

(58) Field of Classification Search
CPC .... G01J 3/2823; G01J 3/51; G01J 3/18; G01J 3/2803; G01J 3/0229; G01J 1/42; G01J 1/0219; G01J 1/0228; G01J 1/0238; G01J 1/0411; G01J 1/0433; G01J 1/0492; H01J 37/32972; H01J 2237/24585;
(Continued)

(56) References Cited

U.S. PATENT DOCUMENTS 10,473,525 B2 11/2019 Meng et al.
2003/0056899 A1* 3/2003 Hanazaki .......... H01J 37/32935
                                                          156/345.24
(Continued)

FOREIGN PATENT DOCUMENTS

CN    113496912     10/2021
KR    10-1764940    8/2017
(Continued)

*Primary Examiner* — Seung C Sohn
(74) *Attorney, Agent, or Firm* — Fish & Richardson P.C.

(57) ABSTRACT

A sensor device includes a lower substrate, an upper substrate disposed on the lower substrate, formed of a material different from a material of the lower substrate, and including a plurality of light-receiving regions disposed in different positions, a plurality of optical members disposed between the lower substrate and the upper substrate, and configured to be generated in a plasma formed in a space above the upper substrate and to provide a traveling path of light entering the plurality of light-receiving regions, a spectrum sensor configured to detect intensity of light received through each of the plurality of optical members in a predetermined wavelength band, a controller configured to generate raw data including intensity of light according to the wavelength band by matching the raw data with each of the plurality of light-receiving regions.

20 Claims, 18 Drawing Sheets

(58) Field of Classification Search
CPC .......... H01J 37/32009; H01L 21/67011; H01L 21/67253
See application file for complete search history.

(56) References Cited

U.S. PATENT DOCUMENTS

| | | |
|---|---|---|
| 2012/0318966 A1 | 12/2012 | Jensen et al. |
| 2015/0179417 A1 | 6/2015 | Tatsumi et al. |
| 2017/0141001 A1 | 5/2017 | Sakiyama et al. |
| 2020/0372629 A1* | 11/2020 | Chen .................. G01N 21/8806 |
| 2021/0280399 A1 | 9/2021 | Pan et al. |
| 2023/0142868 A1 | 5/2023 | Wu |

FOREIGN PATENT DOCUMENTS

| | | |
|---|---|---|
| KR | 10-2018-0116434 | 10/2018 |
| KR | 10-2412223 | 6/2022 |
| WO | WO 2011/090850 | 7/2011 |
| WO | WO 2012/173999 | 12/2012 |

\* cited by examiner ns, a plurality of optical members disposed between the lower substrate and the upper substrate, and configured to provide a traveling path of light generated in a plasma formed in a space above the upper substrate and entering the plurality of light-receiving areas, a spectrum sensor configured to detect intensity of light received through each of the plurality of optical members in a predetermined wavelength band, a controller configured to generate raw data including intensity of light according to the wavelength band by matching the raw data with each of the plurality of light-receiving areas.

According to some aspects of this disclosure, a semiconductor processing apparatus includes a chamber, a first bias electrode and a second bias electrode installed to oppose each other in a space in the chamber, an electrostatic chuck disposed above the first bias electrode, and a control device configured to control the first bias electrode and the second bias electrode, wherein the control device is configured to form plasma in a space in the chamber by supplying RF power to each of the first bias electrode and the second bias electrode in a state in which a sensor device is seated on the electrostatic chuck, and the control device is configured to control the first bias electrode and the second bias electrode using characteristic data including intensity of light detected by the sensor device from the plasma, and wherein the sensor device includes an upper substrate configured to provide a plurality of light-receiving areas, a plurality of optical members connected to the plurality of light-receiving areas, a wavelength selector configured transmit light guided by at least one of the plurality of optical members in a predetermined wavelength band, and an optical detector configured to detect intensity of light output by the wavelength selector.

SENSOR DEVICE AND SEMICONDUCTOR PROCESSING APPARATUS USING THE SAME

CROSS-REFERENCE TO RELATED APPLICATION(S)

This application claims benefit of priority to Korean Patent Application No. 10-2023-0059209 filed on May 8, 2023, in the Korean Intellectual Property Office, the disclosure of which is incorporated herein by reference in its entirety.

BACKGROUND

In a semiconductor processing apparatus for performing a semiconductor process using plasma, it may be necessary to accurately control uniformity of plasma formed on a process target such as a wafer to improve yield. Various attempts have been made to improve uniformity of plasma, and methods of increasing efficiency of a semiconductor process by immediately measuring uniformity of plasma have been suggested. Before performing a semiconductor process, control variables of the semiconductor processing apparatus may be adjusted while observing plasma through a viewing port of the semiconductor processing apparatus. However, it may be difficult to accurately determine uniformity of the plasma by simply observing the plasma through the viewing port, and accordingly, uniformity of the plasma may not be accurately controlled during the actual semiconductor process.

SUMMARY

Aspects of this disclosure relate to sensor devices which may be used to form plasma having a desired thickness and density in semiconductor processes and may improve yield of semiconductor processes by, before performing the semiconductor process, collecting raw data representing a state of the plasma formed on the sensor device. The sensor device is able to be put into a semiconductor processing apparatus to determine various properties including uniformity of the plasma based on the raw data. Semiconductor processing apparatuses using the sensor devices.

According to some aspects of this disclosure, a sensor device includes a lower substrate, an upper substrate disposed on the lower substrate and including at least one light-receiving area, an optical member disposed in a space between the lower substrate and the upper substrate, and including a light-receiving optical system configured to reflect light entering the at least one light-receiving area in a direction parallel to the upper surface of the lower substrate and a light guide configured to guide light reflected from the light-receiving optical system, a selection element disposed in the space and configured to selectively output light guided by the at least one optical member, a spectrum sensor disposed in the space and including a wavelength selector configured to separate light output by the selection element in a predetermined wavelength band and an optical detector configured to detect intensity of light in the wavelength band, wherein a wavelength selector includes at least one of a plasmonic filter and a grid structure.

According to some aspects of this disclosure, a sensor device includes a lower substrate, an upper substrate disposed on the lower substrate, formed of a material different from a material of the lower substrate, and including a plurality of light-receiving areas disposed in different posi-

BRIEF DESCRIPTION OF DRAWINGS

The above and other aspects, features, and advantages will be more clearly understood from the following detailed description, taken in combination with the accompanying drawings, in which.

DETAILED DESCRIPTION

Hereinafter, examples according to this disclosure will be described as follows with reference to the accompanying drawings.

Figure 1:
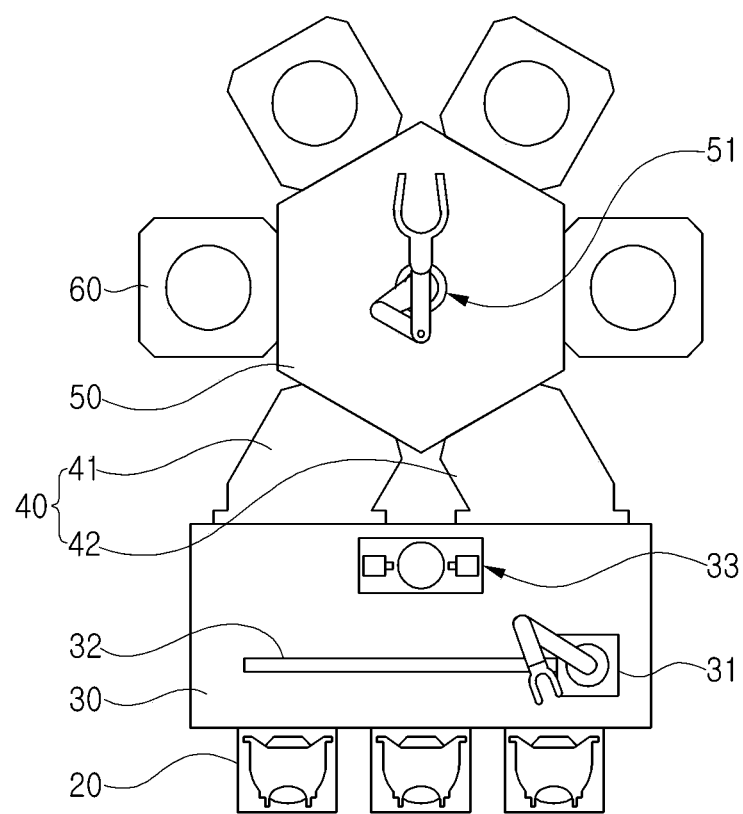
FIG. 1 is a diagram illustrating a semiconductor process system according to some implementations of the present disclosure.

FIG. 1 is a diagram illustrating a semiconductor process system according to some implementations.

Referring to FIG. 1, a semiconductor process system 10 according to some implementations includes a wafer transfer device 30, a load-lock chamber 40, a transfer chamber 50 and a plurality of semiconductor processing apparatuses 60. For example, the wafer transfer device 30 may receive a wafer through a container such as a front open unified pod 20 (FOUP) in a line in which the semiconductor process system 10 is disposed. The wafer transfer device 30 may transfer wafers received through the FOUP 20 to the load-lock chamber 40 and may receive wafers for which a semiconductor process has been completed in the process chambers 60 from the load-lock chamber 40 and may store the wafers in the FOUP 20.

The wafer transfer device 30 includes a wafer transfer robot 31 having an arm for holding a wafer, a rail portion 32 for moving the wafer transfer robot 31, and an aligner 33 for aligning wafers. Assuming an operation of transferring wafers from the FOUP 20 to the load-lock chamber 40, the wafer transfer robot 31 may remove wafers stored in the FOUP 20 and may dispose the wafers on an aligner 33. In the aligner 33, wafers may be aligned in one predetermined direction by the aligner 33 rotating the wafers. After wafer alignment is completed by the aligner 33, the wafer transfer robot 31 may remove the wafer from the aligner 33 and may transfer the wafers to the load-lock chamber 40.

The load-lock chamber 40 includes a loading chamber 41 connected to the wafer transfer device 30 and in which wafers entering the semiconductor processing apparatus 60 may temporarily stay for the semiconductor process, and an unloading chamber 42 in which wafers taken out of the process chamber 60 may temporarily stay after the process is completed. When the wafers aligned in the aligner 33 enter the loading chamber 41, the internal side of the loading chamber 41 may be depressurized to prevent external contaminants from entering.

The load-lock chamber 40 is connected to the transfer chamber 50, and a plurality of semiconductor processing apparatuses 60 are connected around the transfer chamber 50. In the transfer chamber 50, a wafer transfer robot 51 for transferring wafers between the load-lock chamber 40 and the plurality of process chambers 60 may be disposed. The wafer transfer robot 31 of the wafer transfer device 30 may be referred to as a first wafer transfer robot, and the wafer transfer robot 51 of the transfer chamber 50 may be referred to as a second wafer transfer robot.

Each of the plurality of semiconductor processing apparatuses 60 may perform a semiconductor process for a wafer. For example, a semiconductor process performed by the plurality of semiconductor processing apparatuses 60 may include a deposition process, an etching process, an exposure process, an annealing process, a polishing process, an ion implantation process, and the like.

To perform at least a portion of the aforementioned semiconductor processes, a plasma may be formed in at least one of the plurality of semiconductor processing apparatuses 60. For example, the plasma may be formed on a wafer, a mask, and a mother substrate for displays, which may be objects of the semiconductor process, and yield of the process may vary depending on how the plasma is formed. Accordingly, prior to actually performing a semiconductor process in the semiconductor processing apparatuses 60, an operation of forming a plasma and analyzing characteristics thereof may be performed.

In some implementations, characteristics of plasma formed in semiconductor processing apparatuses 60 are analyzed using a sensor device having a shape such as a wafer, a mask, and a mother substrate for a display as a process target. For example, the sensor device may include a plurality of optical members installed in different positions and receiving light emitted from plasma, and an optical detector for detecting the intensity of light transmitted by the plurality of optical members.

In some implementations, the intensity of light detected by the optical detector is processed in the form of raw data, and the raw data may be used to analyze uniformity of the plasma. For example, a thickness and/or density of the plasma may be analyzed using the raw data. Accordingly, control variables of the semiconductor processing apparatus 60 may be accurately determined such that a plasma having desired characteristics may be formed. For example, the control variables may include RF power supplied to the semiconductor processing apparatus 60, a position of an electrode disposed in the semiconductor processing apparatus 60, and/or internal temperature and/or pressure of the semiconductor processing apparatus 60. By analyzing characteristics of the plasma in advance using the sensor device and determining the control variables of the semiconductor processing apparatus 60 based on the characteristics, a yield of the semiconductor process may be improved.

Figure 2:
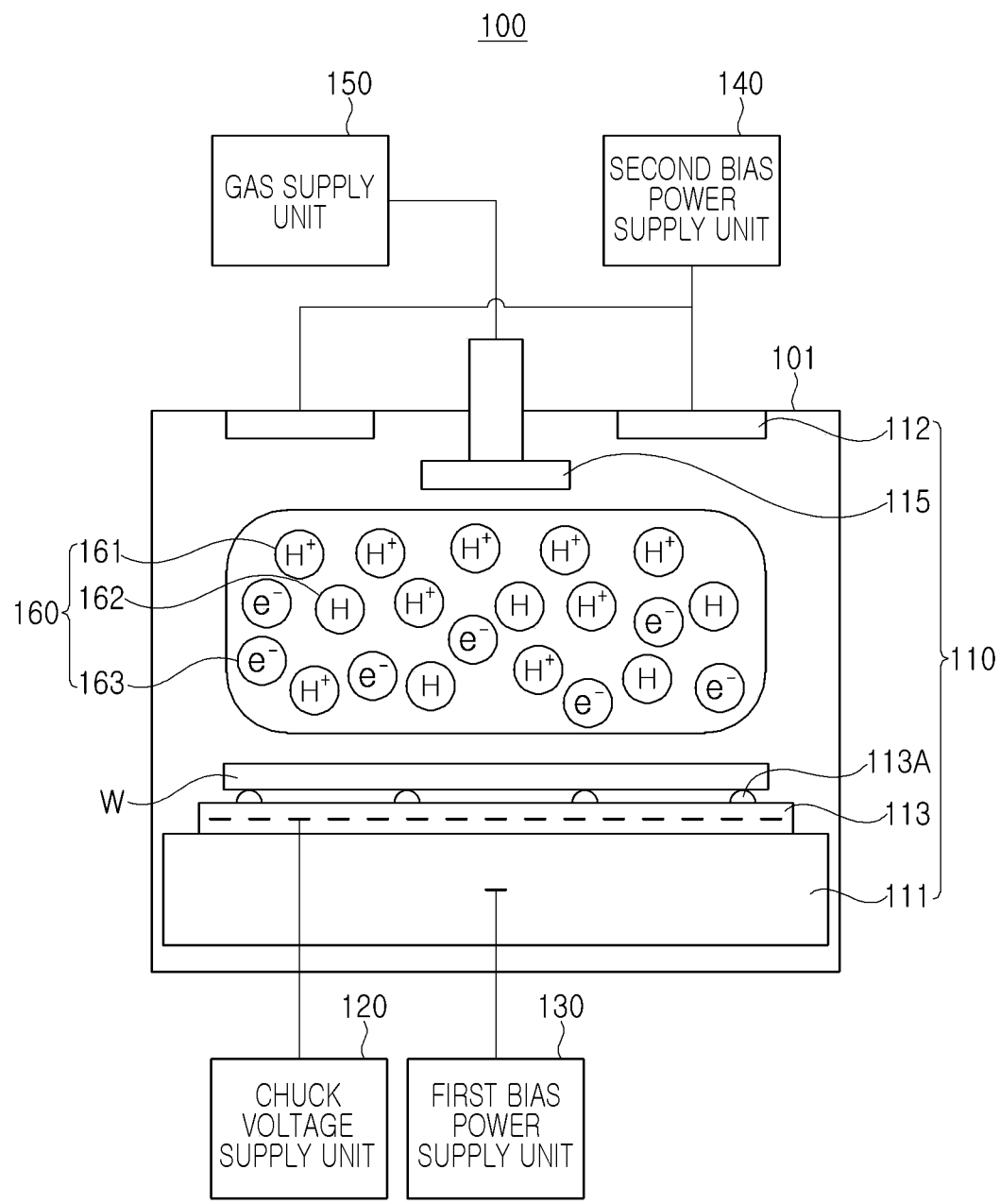
FIG. 2 is a diagram illustrating a semiconductor processing apparatus according to some implementations of the present disclosure.

FIG. 2 is a diagram illustrating a semiconductor processing apparatus according to some implementations.

The semiconductor processing apparatus 100 according to some implementations is configured as a device for performing a semiconductor process using plasma. The semiconductor processing apparatus 100 includes a chamber 110, a chuck voltage supply unit 120, a first bias power supply unit 130, a second bias power supply unit 140, and a gas supply unit 150.

The chamber 110 includes a housing 101, a first bias electrode 111, a second bias electrode 112, an electrostatic chuck 113, and a gas flow path 114. A process target for a semiconductor processing may be seated on the electrostatic chuck 113. In some implementations as illustrated in FIG. 2, the process target is illustrated as the wafer W, but the process target may be changed to a mother substrate for display, a mask, and the like.

As illustrated in FIG. 2, a plurality of protrusions 113A having a protruding shape may be formed on an upper surface of the electrostatic chuck 113. The wafer W may be seated on the protrusion 113A, and accordingly, a space may be formed between the upper surface of the electrostatic chuck 113 and the wafer W. For example, a space between the upper surface of the electrostatic chuck 113 and the wafer W may be filled with helium gas for the purpose of cooling the wafer W.

In some implementations, the wafer W is fixed to the electrostatic chuck 113 by a Coulomb force generated by a chuck voltage supplied to the electrostatic chuck 113 by a chuck voltage supply unit 120. For example, chuck voltage supply unit 120 may supply chuck voltage to an electrostatic chuck 113 in the form of a constant voltage, and the chuck voltage may range in the hundreds to thousands of volts.

Reactive gas may flow in through the gas flow path 114 to perform the semiconductor process. A first bias power supply unit 130 may supply first bias power to the first bias electrode 111 disposed below the electrostatic chuck 113, and the second bias power supply unit 140 may supply second bias power to the second bias electrode 112 disposed above the electrostatic chuck 113. Each of the first bias power supply unit 130 and the second bias power supply unit 140 may include a radio frequency (RF) power source for supplying bias power.

The plasma 160, including ions 161, radicals 162, and electrons 163 of reactive gas, may be formed in the space above the wafer W by the first bias power and the second bias power, and reactive gas may be activated by the plasma 160, such that reactivity may increase. For example, when the semiconductor processing apparatus 100 is configured as an etching device (e.g., based on the first bias power supplied to the first bias electrode 111 by the first bias power supply unit 130), the reactive gas ions 161, the radicals 162, and the electrons 163 may be accelerated with respect to the wafer W. At least a portion of the semiconductor substrate or layers included in the wafer W may be dry-etched by the ions 161, the radicals 162 and the electrons 163 of reactive gas.

Light may be emitted while particles such as the ions 161 are stabilized in the plasma 160, and a wavelength band of light emitted may differ depending on chemical species. Accordingly, by detecting intensity of light emitted from the plasma 160 in a predetermined wavelength band, characteristics such as density and thickness of plasma may be detected.

In some implementations, instead of the wafer W on which an etching process and/or a deposition process using plasma 160 are performed, a separately manufactured sensor device may be disposed on the electrostatic chuck 113, and characteristics such as uniformity of the plasma 160 may be analyzed using the data collected by the sensor device. The sensor device may include a plurality of optical members for receiving light emitted from the plasma 160 and an optical detector for measuring intensity of light transmitted by the plurality of optical members.

The plurality of optical members may be installed in a sensor device to receive light emitted from different positions of the plasma 160, and an optical detector may detect intensity of light in a predetermined wavelength band. For example, a wavelength selector for selecting a specific wavelength band in light may be disposed between the optical detector and the plurality of optical members. The wavelength selector may be implemented, for example, as a plasmonic filter, a grid structure, or a microresonator using the thin film interference principle.

Figure 3A:
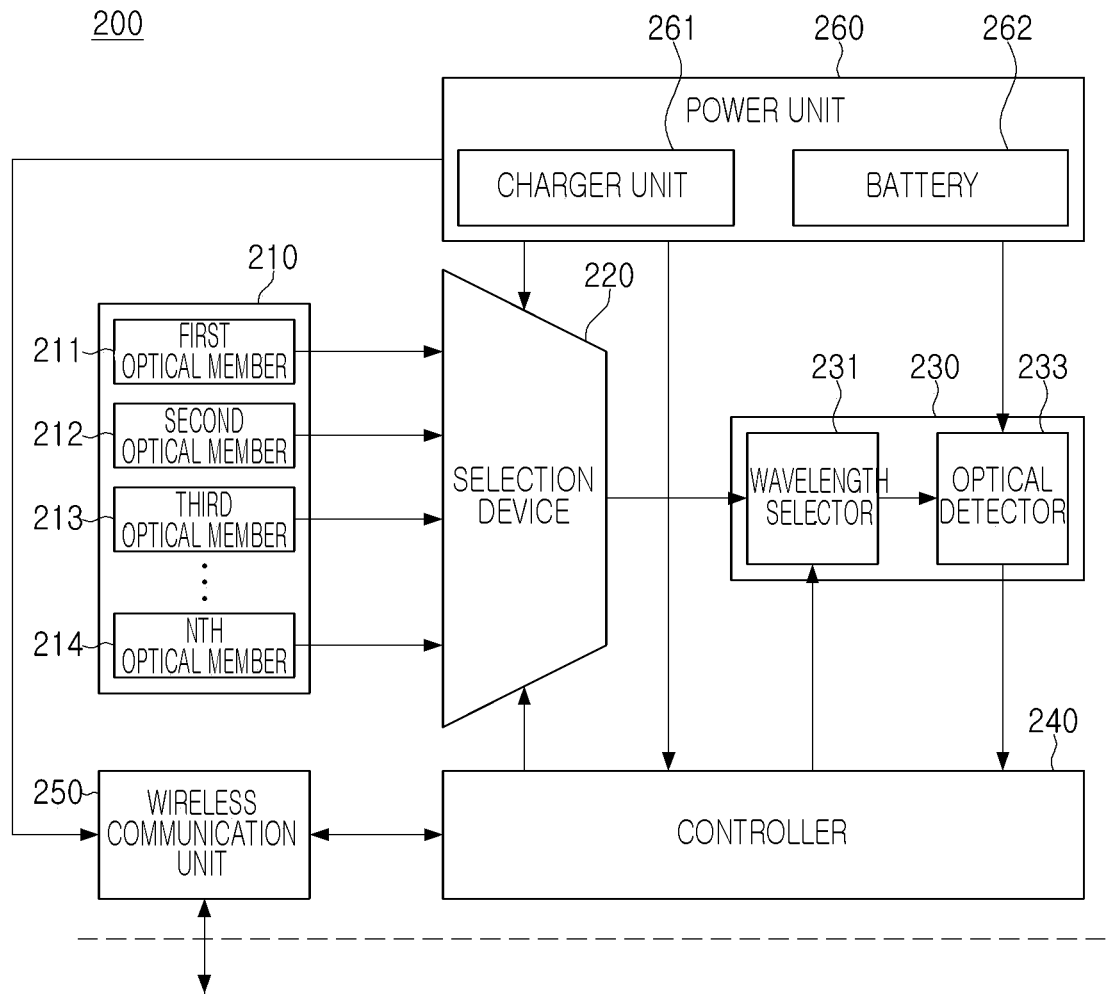
FIGS. 3A to 3C are diagrams illustrating a sensor device according to some implementations of the present disclosure.
Figure 3B:
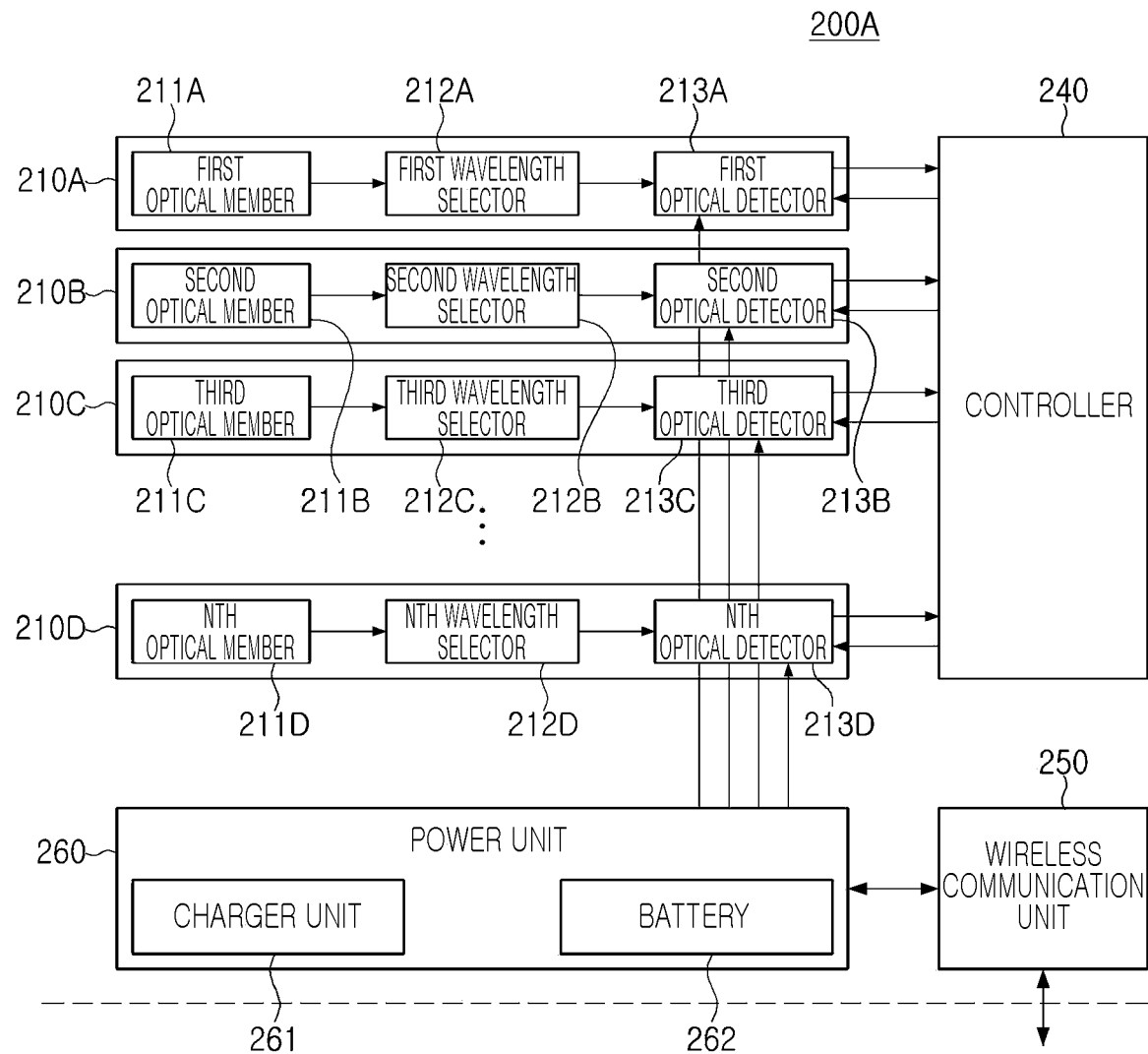
Figure 3C:
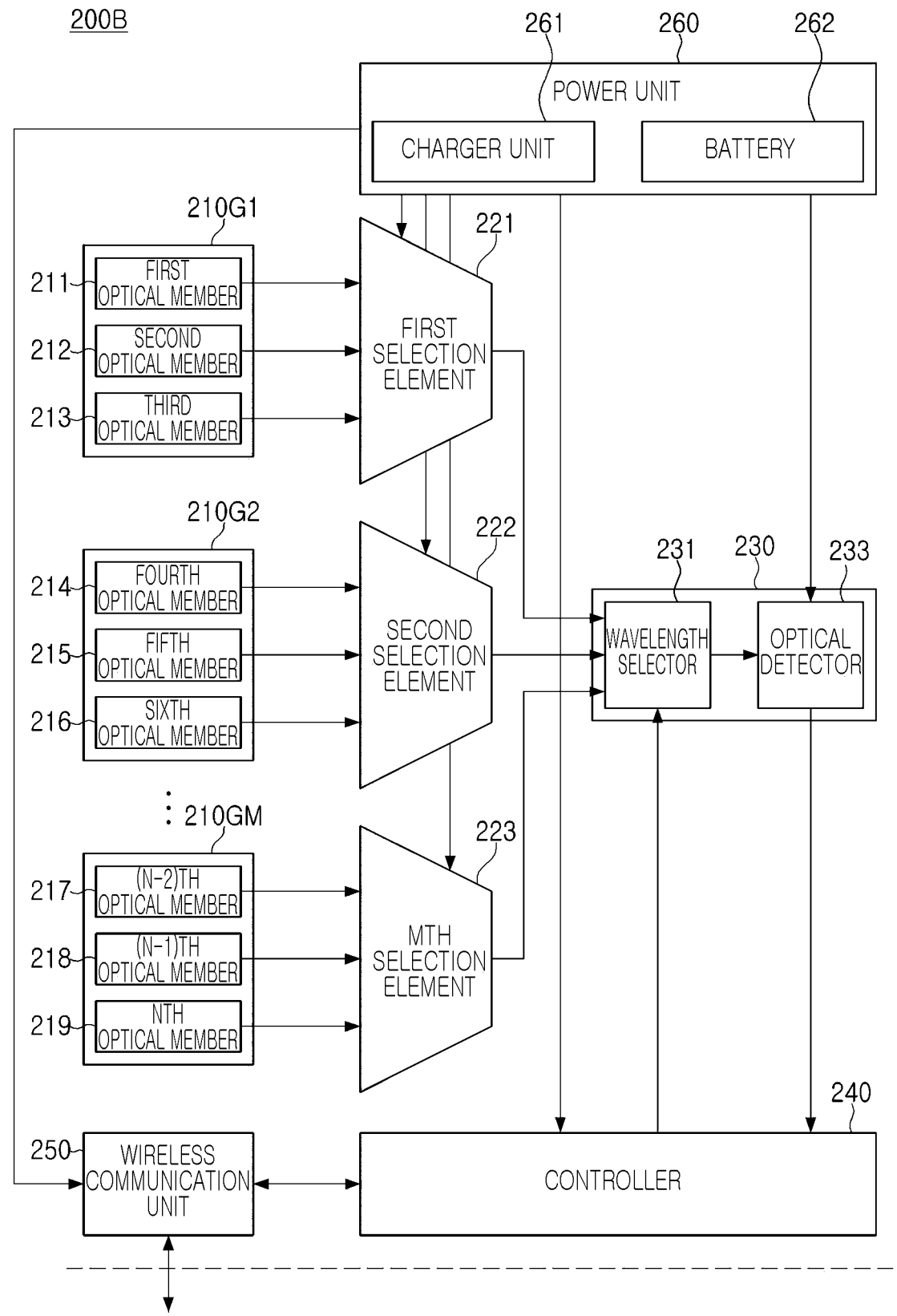

FIGS. 3A to 3C are diagrams illustrating a sensor device according to some implementations.

Referring to FIG. 3A, a sensor device 200 according to some implementations includes a plurality of optical members 211-214 (210), a selection element 220 (e.g., a selection device), a spectrum sensor 230, a controller 240, a wireless communication unit 250, and a power unit 260. When the sensor device is installed in the semiconductor processing apparatus, a plasma may be formed on the sensor device, and the plurality of optical members 210 may receive light emitted from different positions of the plasma.

The selection element 220 may output light transmitted by one of the plurality of optical members 210 to the spectrum sensor 230 in response to a command from the controller 240. The spectrum sensor 230 in this example includes a wavelength selector 231 and an optical detector 233. The wavelength selector 231 selects a predetermined wavelength band from light output by the selection element 220 and transfers light in the selected wavelength band to the optical detector 233. The optical detector 233 detects intensity of light in the wavelength band selected by the wavelength selector 231 and transmits the detected intensity to the controller 240.

The wavelength selector 231 may be implemented, for example, as a plasmonic filter or grid structure and, for example, may select a wavelength band from hundreds of nanometers to several micrometers. In some implementations, the wavelength selector 231 transmits light in a wavelength band ranging from 200 nm to 3 um to the optical detector 233. When the wavelength selector 231 is implemented as a plasmonic filter, the wavelength selector 231 may include a plurality of filter regions passing light of different wavelength bands. In some implementations, each of a plurality of filter regions may pass light at a specific wavelength band of tens of nanometers. However, in some implementations, the wavelength selector 231 may be implemented in another form, such as a microresonator.

Accordingly, the controller 240 may obtain intensities of light emitted from a plurality of different regions of the plasma in different wavelength bands. The controller 240 may generate data (e.g., raw data) including and/or indicating one or more intensities of light obtained from the optical detector 233. In some implementations, the controller 240 directly generates image data representing characteristics of plasma using the raw data, and may transmit the image data to an external entity through a wireless communication unit 250. Alternatively, or in addition, the controller 240 may generate raw data and may transmit the raw data to an external entity through the wireless communication unit 250. In this case, the operation of generating image data representing characteristics of the plasma using the raw data may be executed by another external device.

The power unit 260 may include a charger unit 261 and a battery 262, and may output power necessary for operations such as the selection element 220, the optical detector 233, the controller 240, and the wireless communication unit 250. The charger unit 261 may charge the battery 262 in a wired or wireless manner. In some implementations, the power unit 260 may include two or more batteries 262 disposed in different positions.

Referring to FIG. 3B, a sensor device 200A according to some implementations includes a plurality of optical sets 210A-210D, a controller 240, a wireless communication unit 250, and a power unit 260. Each of a plurality of optical sets 210A-210D includes an optical member, a wavelength selector, and an optical detector.

For example, the first optical set 210A may include a first optical member 211A for receiving light entering the first light-receiving area, a first wavelength selector 212A for selectively passing light received by the first optical member 211A in a first wavelength band, and a first optical detector 213A for measuring intensity of light output by the first wavelength selector 212A. The second optical set 210B may include a second optical member 211B for receiving light entering the second light-receiving area, second wavelength selector 212B for selectively passing light received by the second optical member 211B in the second wavelength band, and a second optical detector 213B for measuring intensity of light output by the second wavelength selector 212B.

The first light-receiving area and the second light-receiving area may be defined in different positions, and the first wavelength band and the second wavelength band may be different from each other. In such a manner described above, a plurality of optical sets 210A-210D may detect intensity of light emitted from different positions in a predetermined wavelength band. Differently from the implementations as described with reference to FIG. 3A, the sensor device 200A in some implementations illustrated in FIG. 3B may not include a selection element. Instead, the controller 240 may selectively turn on/off the optical detectors 213A-213D included in a plurality of optical sets 210A-210D, such that the controller 240 may receive intensities of light detected by each of the optical detectors 213A-213D.

Referring to FIG. 3C, the sensor device 200B according to some implementations includes a plurality of optical members 211-219, a plurality of selection probes 221-223, a spectrum sensor 230, a controller 240, a wireless communication unit 250 and a power unit 260. Operations of the spectrum sensor 230, the controller 240, the wireless communication unit 250, and the power unit 260 may be similar to the examples described above with reference to FIG. 3A.

In some implementations illustrated in FIG. 3C, the plurality of optical members 211-219 are connected to one of a plurality of selection elements 221-223 on a group-by-group basis. Referring to FIG. 3C, the first to third optical members 211-213 included in a first group 210G1 are connected to the first selection element 221, and the fourth to sixth optical members 214-216 included in a second group 210G2 are connected to the second selection element 222. N-2nd to Nth optical members 217-219 included an Mth group 210GM are connected to Mth selection element 223. Since at least some of the plurality of selection elements 221-223 is connected to two or more of the optical members 211-219, the number of a plurality of selection elements 221-223 is less than the number of the plurality of optical members 211-219.

The controller 240 may activate the plurality of selection elements 221 to 223 one by one. For example, when the first selection element 221 is activated, the spectrum sensor 230 may receive beams of light guided by each of the first to third optical members 211-213 one at a time, thereby detecting intensity of light entering the first to third light-receiving areas connected to the first to third optical members 211-213 in a specific wavelength band. As such, the spectrum sensor 230 may detect intensities of light guided by the plurality of optical members 211-219 in a predetermined wavelength band through the plurality of selection elements 221-223.

In some implementations illustrated in FIG. 3C, the number of optical members connected to one selection element may be relatively small as compared to the example illustrated in FIG. 3A. Accordingly, the sensor device 200B may be implemented with the selection elements 221 to 223 having a relatively narrow wide angle.

Figure 4A:
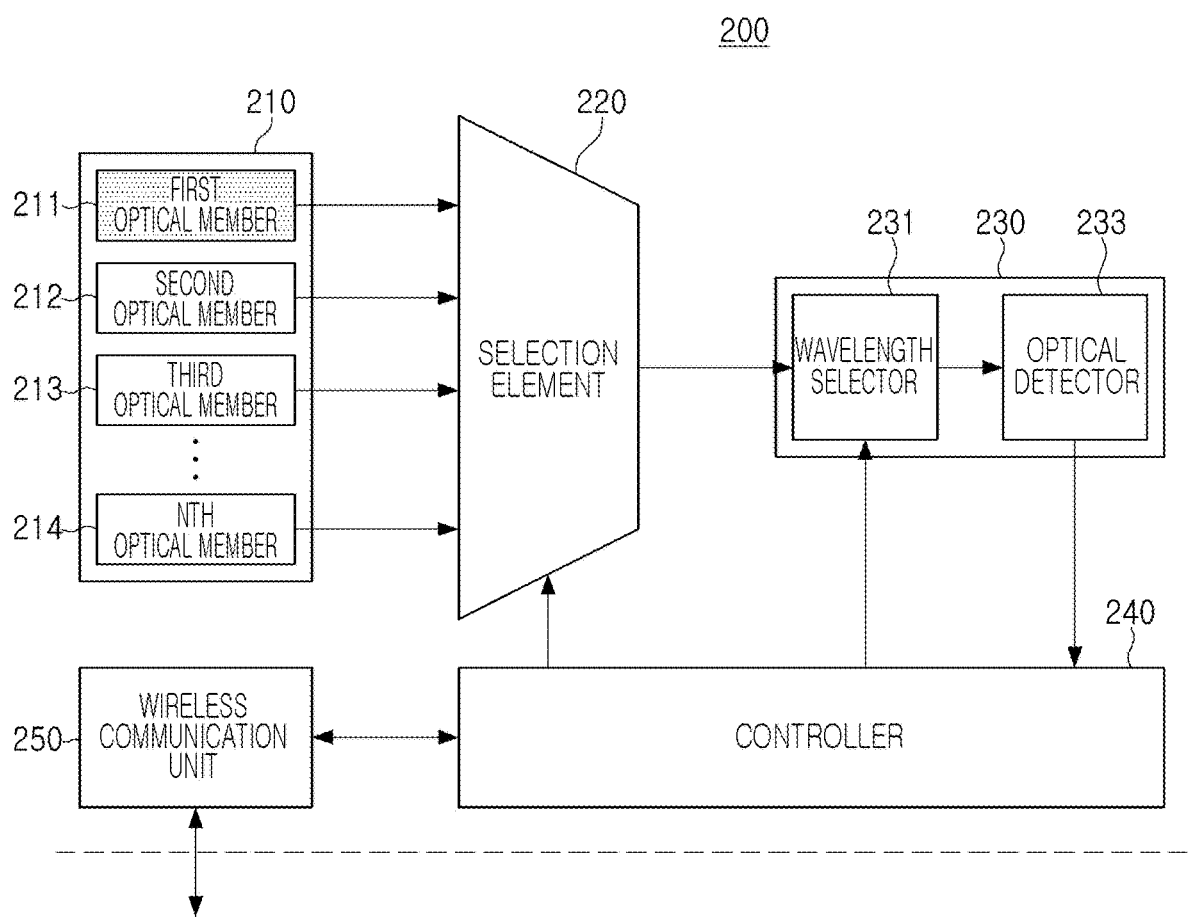
FIGS. 4A and 4B are diagrams illustrating operations of a sensor device according to some implementations of the present disclosure.
Figure 4B:
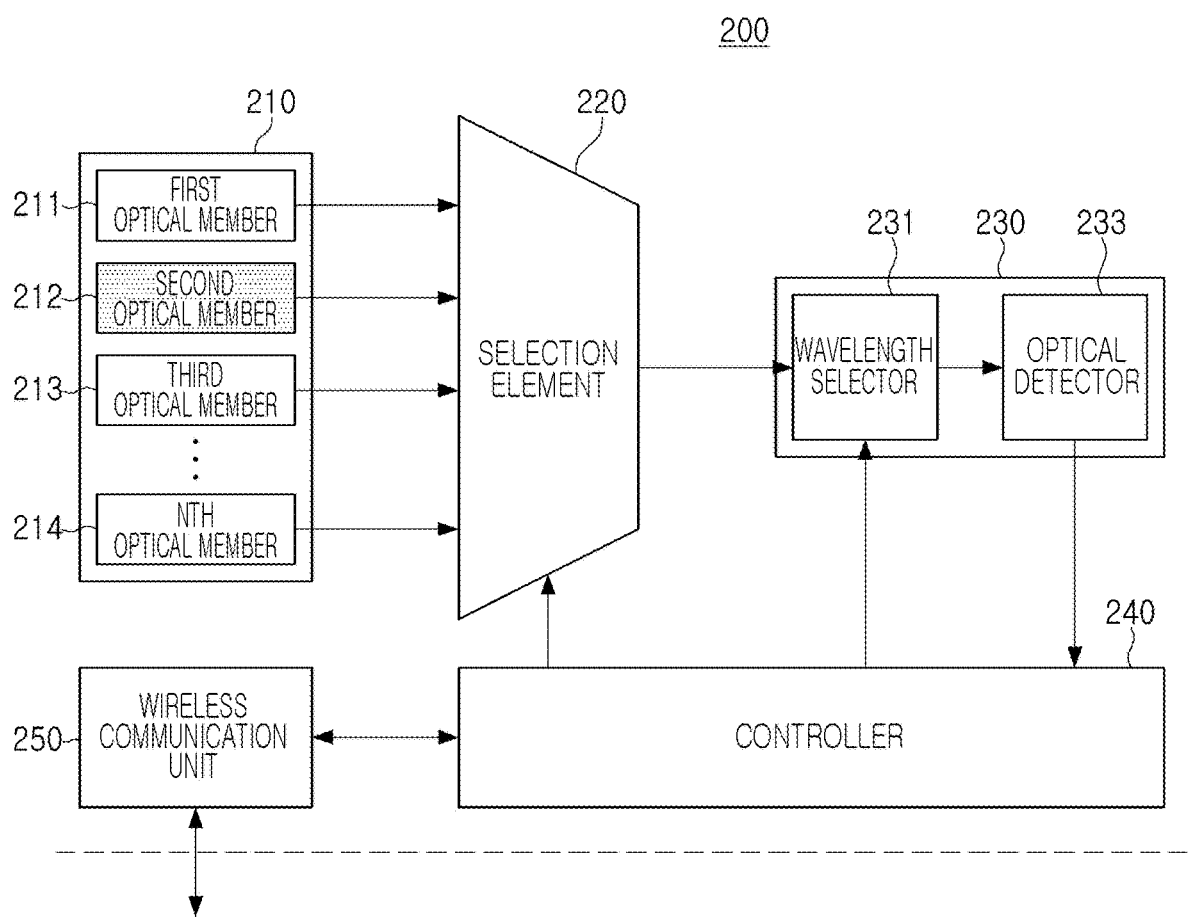

FIGS. 4A and 4B are diagrams illustrating operations of a sensor device according to some implementations.

First, referring to FIG. 4A, the controller 240 controls the selection element 220 such that light transmitted from the first optical member 211 may be input to the wavelength selector 231. In other words, the controller 240 may determine the first optical member 211 from among the plurality of optical members 210 as a selected optical member.

A plasma is formed on the sensor device 200, and a first optical member 211 receives light emitted from the plasma in a first position of the sensor device 200 and guide light to the selection element 220. The wavelength selector 231 may filter a predetermined wavelength band from light emitted from the first position of the plasma and transmit light to the optical detector 233.

For example, wavelength selector 231 may be configured to pass light at a selected wavelength band ranging from hundreds of nanometers to several micrometers. Also, the wavelength selector 231 may pass light in each of a plurality of unit wavelength bands obtained by subdividing the selected wavelength band. For example, the wavelength selector 231 may include a plurality of filter regions, and each of the plurality of filter regions may pass light in a unit wavelength band of several tens of nanometers. A plurality of filter regions may have different unit wavelength bands. In this case, the optical detector 233 may detect intensity of light emitted from the first position of the sensor device 200 in each of a plurality of unit wavelength bands, and may transmit the result of detection to the controller 240.

Thereafter, referring to FIG. 4B, the controller 240 controls the selection element 220 such that light transmitted by the second optical member 212 is input to the wavelength selector 231. The second optical member 212 receives light emitted from the plasma on the second position of the sensor device 200 and guides light to the selection element 220. The second position may be different from the first position.

The wavelength selector 231, as described above, may pass light in a selected wavelength band, and may pass light in each of a plurality of unit wavelength bands obtained by subdividing the selected wavelength band. Accordingly, the optical detector 233 may detect intensity of light emitted by the plasma on the second position of the sensor device 200 in each of a plurality of unit wavelength bands. By executing the operations described with reference to FIGS. 4A and 4B for each of the plurality of optical members 210, the controller 240 may obtain intensity of light emitted from the plasma by dividing the intensity depending on a plurality of unit wavelength bands on each of a plurality of positions defined in the sensor device 200.

Figure 5:
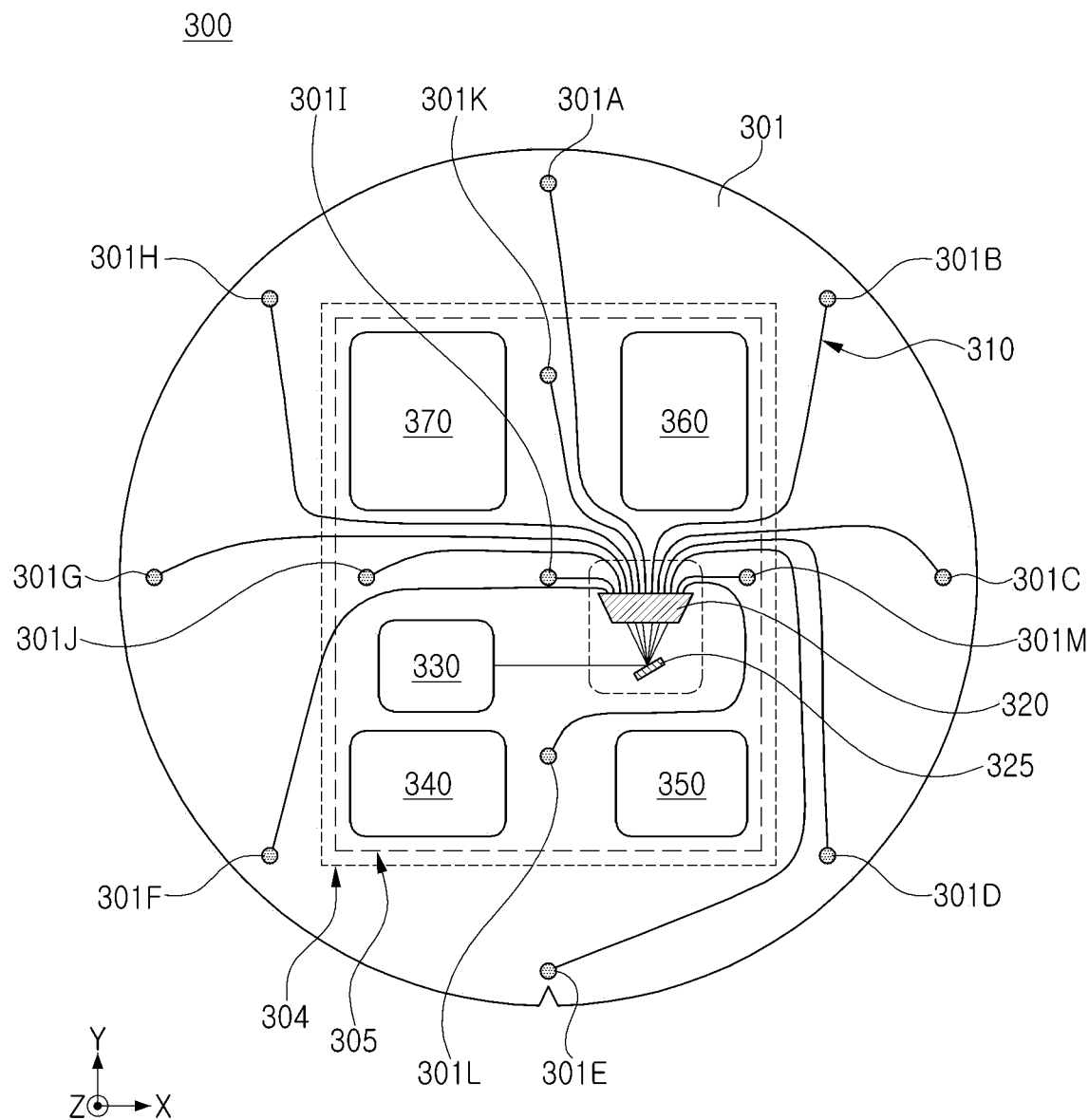
FIGS. 5, 6A and 6B are diagrams illustrating a sensor device according to some implementations of the present disclosure.
Figure 6A:
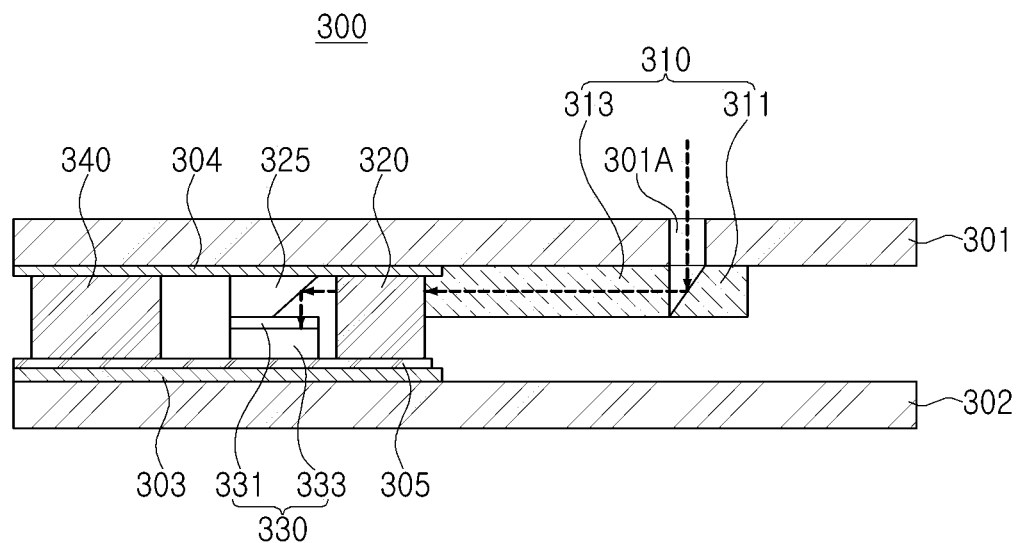
Figure 6B:
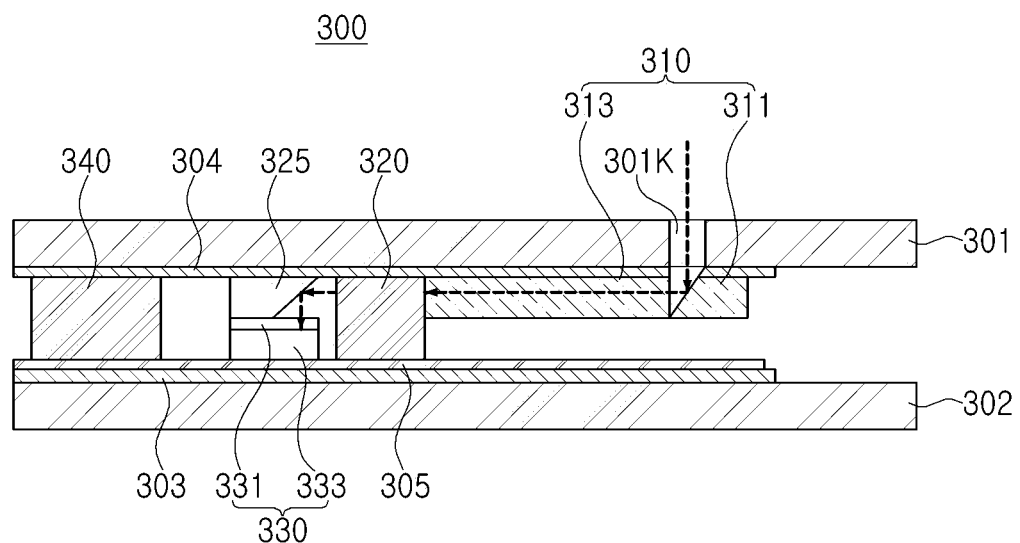

FIGS. 5, 6A and 6B are diagrams illustrating a sensor device according to some implementations.

Referring to FIGS. 5, 6A and 6B, a sensor device 300 according to some implementations includes an upper substrate 301 and a lower substrate 302. A space may be formed between the upper substrate 301 and the lower substrate 302, and components necessary for operation of the sensor device 300 may be disposed in this space. The upper substrate 301 and the lower substrate 302 may be formed of different materials. For example, the upper substrate 301 may be formed of quartz, and the lower substrate 302 may be formed of silicon.

The upper substrate 301 includes a plurality of light-receiving areas 301A-301M, and the number of a plurality of light-receiving areas 301A-301M may be varied in different implementations. Each of the plurality of light-receiving areas 301A to 301M is formed on the upper substrate 301 and may include an area having high light transmittance. The plurality of light-receiving areas 301A-301M are formed in different positions of the upper substrate 301, such that, when plasma is formed on the sensor device 300, light emitted from different positions of the plasma may be incident to the plurality of light-receiving areas 301A-301M.

The sensor device 300 includes a plurality of optical members 310, a selection element 320, a spectrum sensor 330, a controller 340, a wireless communication unit 350, and a power unit 360 and 370. Referring to FIGS. 6A and 6B, each of the plurality of optical members 310 includes a light-receiving optical system 311 and a light guide 313. The light-receiving optical system 311 may include a mirror disposed below a corresponding one of the plurality of light-receiving areas 301A-301M, and light reflected from the mirror may be incident to the light guide 313. The mirror can be configured to reflect the light in a direction parallel to the upper surface of the lower substrate 302. The light guide 313 may transfer the light reflected from the light-receiving optical system 311 to the selection element 320, and may include, for example, an optical fiber.

The selection element 320 may determine a selected optical member among the plurality of optical members 310 and may output light transmitted through the selected optical member to the reflective mirror 325. The reflective mirror 325 may change a path of light output by the selection element 320 and may transmit light to the spectrum sensor 330.

The spectrum sensor 330 may include a wavelength selector 331 and an optical detector 333, and the wavelength selector 331 may be disposed in a path along which light travels from the reflective mirror 325 to the optical detector 333. In some implementations described with reference to FIGS. 5, 6A, and 6B, the wavelength selector 331 may include a plasmonic filter. The plasmonic filter may include a plurality of filter regions for transmitting light in different unit wavelength bands, and for example, the plurality of filter regions may be arranged in one direction parallel to an upper surface of the upper substrate 301. For example, the optical detector 333 may include a plurality of light detector elements arranged in one direction (e.g., in a one-dimensional array) to detect intensity of light in each of a plurality of unit wavelength bands. However, in some implementations, the wavelength selector 331 may be implemented differently, e.g., as a microresonator using the thin film interference principle, and in this case, the upper substrate 301 and the lower substrate 302 may be formed of the same material. In some implementations, when the upper substrate 301 and the lower substrate 302 are formed of the same material, the upper substrate 301 and the lower substrate 302 are formed of a material other than silicon.

Intensities of light detected by the spectrum sensor 330 may be transmitted to the controller 340, and the controller 340 may generate data using the intensities of light detected by the spectrum sensor 330. For example, the controller 340 may generate data including the intensities of light according to a wavelength band by matching the raw data with each of the plurality of light-receiving areas 301A-301M. Accordingly, data including the intensity of light detected in a plurality of unit wavelength bands for each of the plurality of light-receiving areas 301A to 301M may be generated.

In some implementations illustrated in FIGS. 5, 6A, and 6B, the controller 340 may be mounted on a circuit substrate 305 together with the selection element 320, the spectrum sensor 330, the wireless communication unit 350, and the power unit 360 and 370. Accordingly, intensities of light detected by the spectrum sensor 330 may be transmitted to the controller 340 through the circuit substrate 305, and the controller 340 may control operations such as the selection element 320 and the spectrum sensor 330 through the circuit substrate 305. In some implementations illustrated in FIGS. 5, 6A, and 6B, the circuit substrate 305 may have a shape different from that of the upper substrate 301 and/or the lower substrate 302.

In some implementations illustrated in FIG. 5, the selection element 320 and/or the spectrum sensor 330 may be disposed closer to respective centers of the upper substrate 301 and lower substrate 302 than the controller 340, the wireless communication unit 350 and the power units 360 and 370. By disposing the selection element 320 and/or the spectrum sensor 330 relatively close to the respective centers of the upper substrate 301 and the lower substrate 302, differences in lengths of the plurality of optical members 310 connecting the plurality of light-receiving areas 301A-301M to the selection element 320 may be reduced.

Referring to FIGS. 6A and 6B, a first protective film 303 is disposed between a lower substrate 302 and a circuit substrate 305, and a second protective film 304 is attached to a lower surface of the upper substrate 301. Each of the first protective film 303 and the second protective film 304 protect the selection element 320, the spectrum sensor 330, the controller 340, the wireless communication unit 350, and/or the power unit 360 and 370. A strong magnetic field may be formed in an internal space of the semiconductor processing apparatus where plasma is formed, and a temperature may also be very high. Each of the first protective film 303 and the second protective film 304 may be formed of a suitable material for protecting elements of the sensor device 300, e.g., Permalloy having high magnetic field shielding performance.

The first protective film 303 may have an area larger than the circuit substrate 305 to effectively protect the selection element 320, the spectrum sensor 330, the controller 340, the wireless communication unit 350, and the power unit 360 and 370. The second protective film 304 may have an area covering the entirety of areas in which at least the selection element 320, the spectrum sensor 330, the controller 340, the wireless communication unit 350, and the power unit 360 and 370 are disposed.

Power required for operation of the selection element 320, the spectrum sensor 330, the controller 340 and the wireless communication unit 350 may be supplied by the power units 360 and 370. The power units 360 and 370 may include a first battery 360 and a charger unit 370. The charger unit 370 may include a circuit for charging the battery 360 in a wired/wireless manner, and may charge the battery 360 in a state in which the sensor device 300 is not mounted on the semiconductor processing apparatus 300, for example. In some implementations, when the sensor device 300 has a wafer-like shape, the charger unit 370 may charge the battery 360 in a wireless charging method while the sensor device 300 is mounted on a FOUP. Depending on the amount of power required by the sensor device 300, two or more batteries 360 may be included in the sensor device 300. In this case, at least one of the two or more batteries 360 may be disposed together with the charging circuit.

A position of each of the plurality of light-receiving areas 301A-301M may be determined to detect intensities of light emitted from various positions of the plasma. Referring to FIG. 5, among the plurality of light-receiving areas 301A-301M, a portion of the light-receiving areas 301A-301H may be disposed around the second protective film 304 (e.g., non-overlapping with the second protective film 304 in a plan view as shown in FIG. 5), and the other light-receiving areas 301I-301M may be disposed on an internal side of the second protective film 304 (e.g., overlapping with the second protective film 304 in the plan view). Differently from the light-receiving areas 301A-301H, the light-receiving areas 301I-301M may overlap the first protective film 303 in a direction perpendicular to an upper surface of the upper substrate 301. For example, the configuration illustrated in FIG. 6A can apply to a light-receiving area 301A-301H, and the configuration illustrated in FIG. 6B can apply to a light-receiving area 301I-301M.

Figure 7:
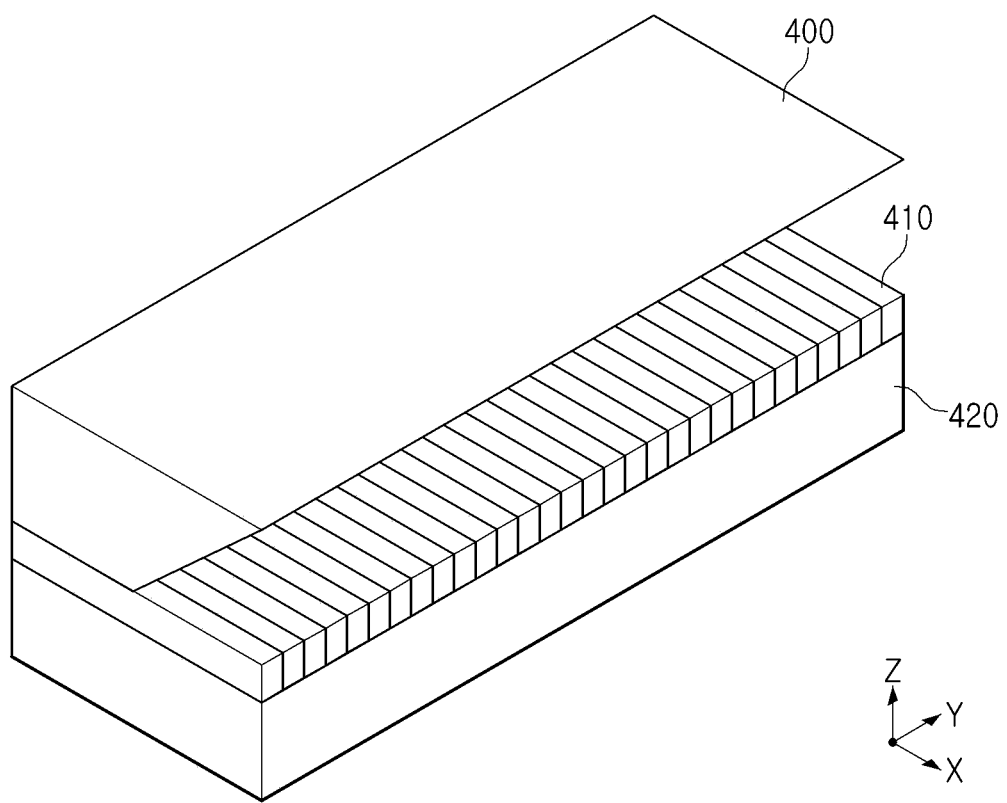
FIGS. 7, 8A, and 8B are diagrams illustrating a plasmonic filter included in a sensor device according to some implementations of the present disclosure.
Figure 8A:
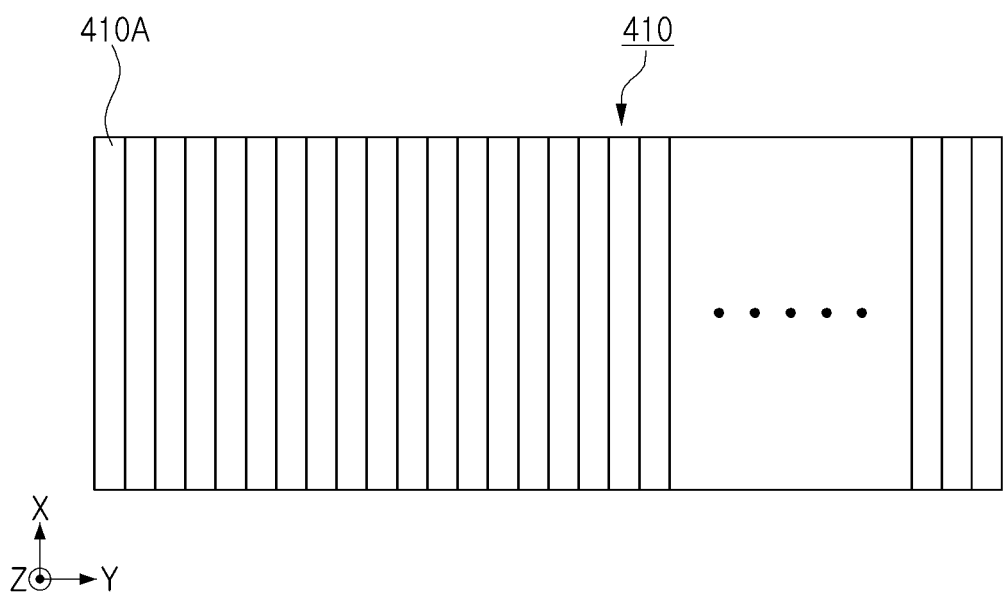
Figure 8B:
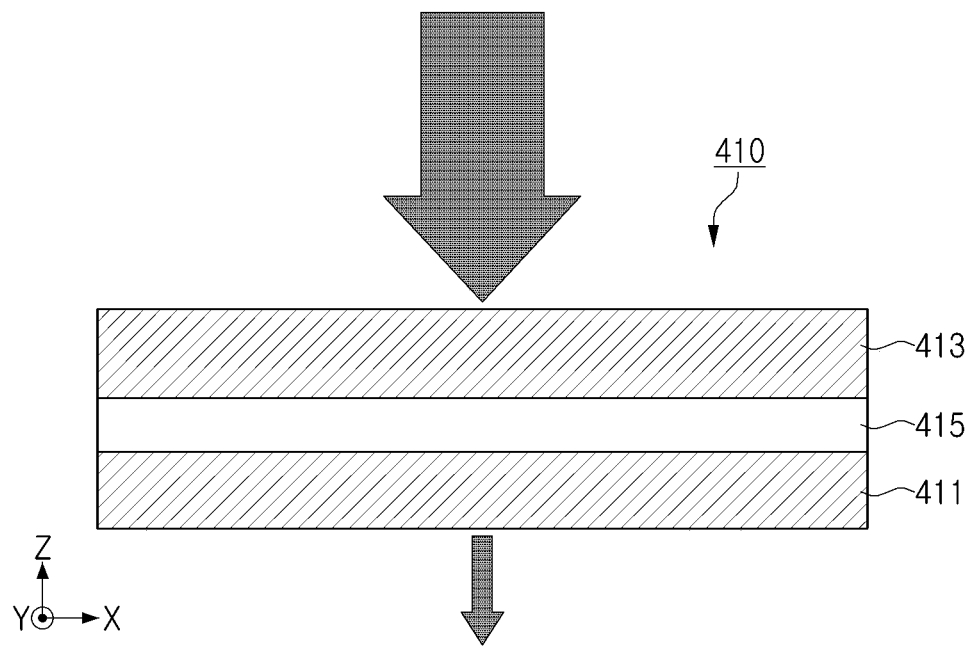

FIGS. 7, 8A, and 8B are diagrams illustrating a plasmonic filter included in a sensor device according to some implementations. The plasmonic filter may be included, for example, in wavelength selector 231 and/or wavelength selector 331.

Referring to FIG. 7, a plasmonic filter 410 is disposed between the reflective mirror 400 and the optical detector 420. The reflective mirror 400 reflects light output by the selection element in a first direction (Z-axis direction) and to allow the light to be incident to the plasmonic filter 410.

The plasmonic filter 410 is disposed above the optical detector 420 in the first direction and may transmit light reflected from the reflective mirror 400 in a predetermined wavelength band. Referring to FIGS. 8A and 8B, the plasmonic filter 410 may include a plurality of filter regions 410A arranged in a second direction (Y-axis direction). Each of a plurality of filter regions 410A may have a shape extending in a third direction (X-axis direction), but the shape is not necessarily limited to the above example.

The plurality of filter regions 410A are configured to transmit light in different unit wavelength bands, and a unit wavelength band of each of the plurality of filter regions 410A may have the same or similar range. For example, a first filter region may transmit light in the first unit wavelength band of 200 nm to 220 nm, the second filter region may transmit light in the second unit wavelength band of 220 nm to 240 nm, and the third filter region may transmit light in the third unit wavelength band of 240 nm to 260 nm.

Referring to FIG. 8B, the plasmonic filter 410 includes a lower layer 411 and an upper layer 413, and a metal layer 415 disposed therebetween. In some implementations, each of the lower layer 411 and the upper layer 413 may be formed of silicon, and the metal layer 415 may include a predetermined pattern. Depending on the pattern included in the metal layer 415, a wavelength band transmitted by the plasmonic filter 410 may be determined.

In some implementations, the plurality of filter regions 410A may be configured to have different unit wavelength bands by forming metal layers 415 of different patterns on each of the plurality of filter regions 410A. For example, as in the example described above, the pattern of the metal layer 415 included in the first filter region transmitting light in the first unit wavelength band of 200 nm to 220 nm may be different from that of the metal layer 415 included in the second filter region transmitting light in the second unit wavelength band of 220 nm to 240 nm.

Figure 9:
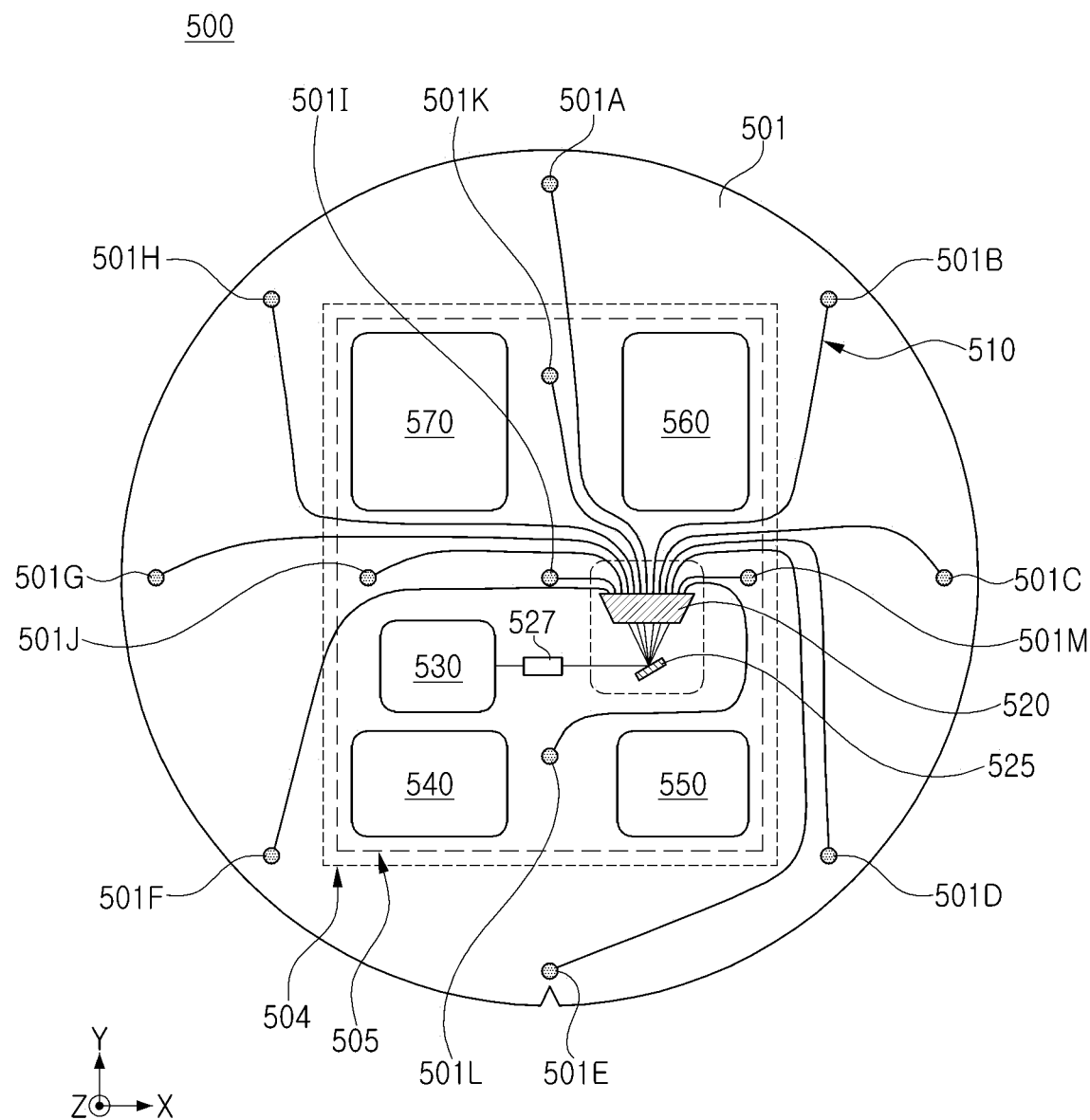
FIGS. 9 and 10 are diagrams illustrating a sensor device according to some implementations of the present disclosure.
Figure 10:
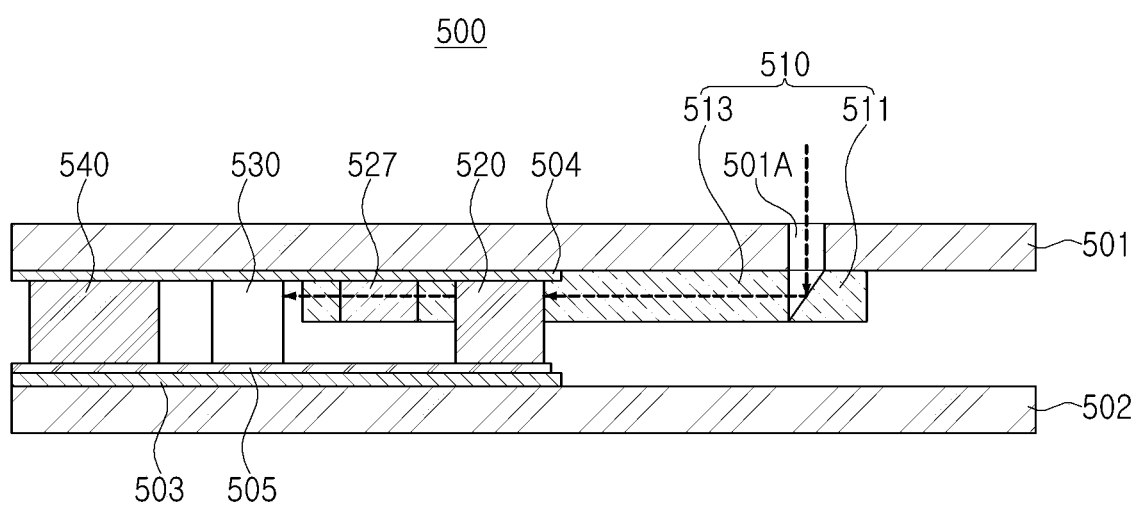

FIGS. 9 and 10 are diagrams illustrating a sensor device according to some implementations.

Referring to FIGS. 9 and 10, a sensor device 500 according to some implementations includes an upper substrate 501, a lower substrate 502, a plurality of optical members 510 disposed in a space between the upper substrate 501 and the lower substrate 502, a selection element 520, and a spectrum sensor 530, a controller 540, a wireless communication unit 550, and a power unit 560 and 570. The upper substrate 501 and the lower substrate 502 may be formed of different materials.

A plurality of optical members 510 connect a plurality of light-receiving areas 501A to 501M formed on the upper substrate 501 to the selection element 520. The selection element 520 may select one of the plurality of optical members 510 and may transmit light entering a corresponding one of the plurality of light-receiving areas 501A to 501M to the spectrum sensor 530. In some implementations illustrated in FIGS. 9 and 10, a collimator 527 may be further disposed between the selection element 520 and the spectrum sensor 530.

The spectrum sensor 530 may (but need not) include a grid structure. The grid structure may disperse light output by the selection element 520 in a predetermined wavelength band. The spectrum sensor 530 may include an optical detector for receiving light scattered in a predetermined wavelength band by the grid structure, and the optical detector may include a plurality of light detector elements arranged in one direction to receive the scattered light. In some implementations, each of the plurality of light detector elements includes a photoelectric element such as a photodiode for generating charges in response to light, and a circuit for converting the charges generated by the photoelectric element into an electrical signal.

An electrical signal output by the plurality of light detector elements in the spectrum sensor 530 may be transferred to the controller 540 through the circuit substrate 505. In addition to the spectrum sensor 530 and the controller 540, the selection element 520, the wireless communication unit 550, and the power unit 560 and 570 may be mounted on the circuit substrate 505. The selection element 520, the spectrum sensor 530, the controller 540, and the wireless communication unit 550 may operate by receiving power from the power units 560 and 570 through the circuit substrate 505.

Similarly to the example described with reference to FIG. 5, a first protective film 503 and a second protective film 504 are attached to the upper substrate 501 and the lower substrate 502. The first protective film 503 may be disposed between the circuit substrate 505 and the lower substrate 502, and may have an area larger than the circuit substrate 505. The second protective film 504 may be attached to the lower surface of the upper substrate 501 and may have an area covering the selection element 520, the spectrum sensor 530, the controller 540, the wireless communication unit 550, and the power units 560 and 570. The first protective film 503 and the second protective film 504 may be formed of Permalloy to protect components of the sensor device 500 from an external high temperature and magnetic field.

As shown in FIG. 9, a portion of the plurality of light-receiving areas 501A-501M, such as light-receiving areas 501A-501H, may be disposed around (e.g., non-overlapping with) the second protective film 504, and the other light-receiving areas 501I-501M may be disposed on the internal side of (e.g., overlapping) the second protective film 504, a combination of positions which may allow characteristics of the plasma to be measured more accurately by distributing the plurality of light-receiving areas 501A-501M in various positions. The light-receiving areas 501I-501M disposed on the internal side of the second protective film 504 may overlap the circuit substrate 505 and/or the first protective film 503 in a direction perpendicular to the upper surface of the upper substrate 501.

In some implementations, the spectrum sensor 330 includes a wavelength selector configured to filter light using a thin film interference principle, and in this case, the upper substrate 501 and the lower substrate 502 may be formed of the same material. The upper substrate 501 and the lower substrate 502 may be formed of a material other than silicon, and the wavelength selector may include a microresonator.

Figure 11:
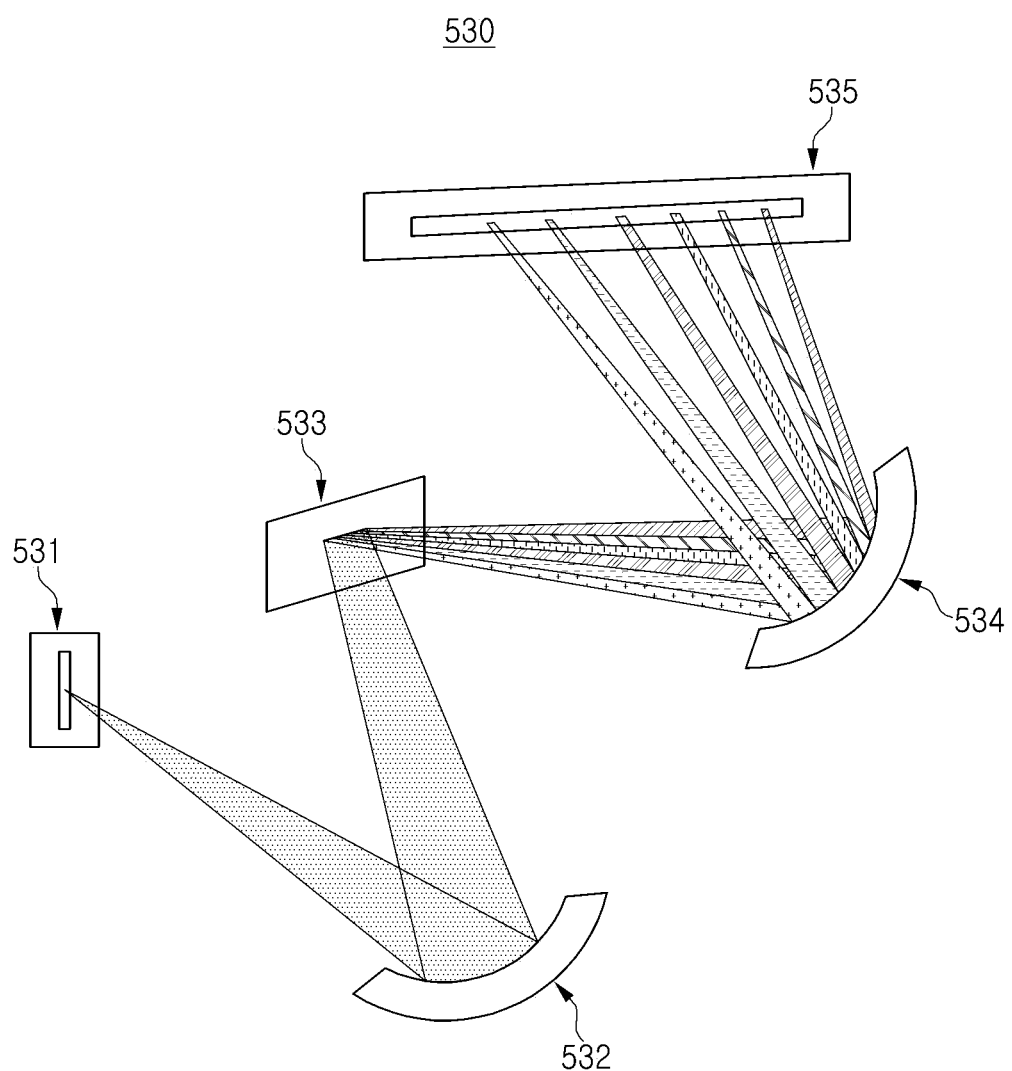
FIG. 11 is a diagram illustrating a spectrum sensor included in a sensor device according to some implementations of the present disclosure.

FIG. 11 is a diagram illustrating a spectrum sensor included in a sensor device according to some implementations.

The spectrum sensor 530 according to some implementations illustrated in FIG. 11 may be applied, for example, to the sensor device 500 in the example described with reference to FIGS. 9 and 10. Referring to FIG. 11, the spectrum sensor 530 includes a slit structure 531, a first mirror 532, a grid structure 533, a second mirror 534, and an optical detector 535. Light output by the selection element 520 passes through the slit structure 531 and is reflected from the first mirror 532. The first mirror 532 may be configured as a collimator lens which may directly reflect light in a predetermined direction without scattering.

Light reflected from the first mirror 532 may be divided for each wavelength band in the grid structure 533. The grid structure 533 may disperse light along a predetermined wavelength band, and light reflected by the grid structure 533 may be reflected by the second mirror 534 which may be a focusing mirror and may be incident to the optical detector 535.

The optical detector 535 is disposed to receive light reflected from the second mirror 534 and, for example, may be implemented as a linear image sensor including a plurality of light detector elements arranged in one direction. In some implementations, when the linear image sensor includes an N number of light detector elements, the light detector elements may be arranged in a 1×N form. As illustrated in FIG. 11, the light detector elements may receive light divided for different wavelength bands by the grid structure 533, and accordingly, the light detector elements may detect intensity of light in different wavelength bands.

Each of the light detector elements may include a photoelectric element for generating charges in response to light, and a circuit for converting the charges of the photoelectric element into an electrical signal, and the electrical signal output by the light detector element may be transmitted to the controller 540. Accordingly, the controller 540 may obtain intensity of light received by the plurality of optical members 510 in different positions for each wavelength band. The controller 540 may generate data representing intensities of light depending on the positions and the wavelength bands, and may transmit the data to an external entity through the wireless communication unit 550. Alternatively, or in addition, the controller 540 may generate image data representing characteristics of the plasma based on the data, and may transmit the image data to an external entity through the wireless communication unit 550.

In some implementations, a position and/or a posture (e.g., angular orientation) of at least one of the slit structure 531, the first mirror 532, the grid structure 533, the second mirror 534 and the optical detector 535 may be adjusted by the controller 540. For example, the controller 540 may adjust the posture of each of the first mirror 532, the grid structure 533, and the second mirror 534 such that light divided for different wavelength bands in the grid structure 533 may be incident to the optical detector 535 after being reflected from the second mirror 534.

Figure 12:
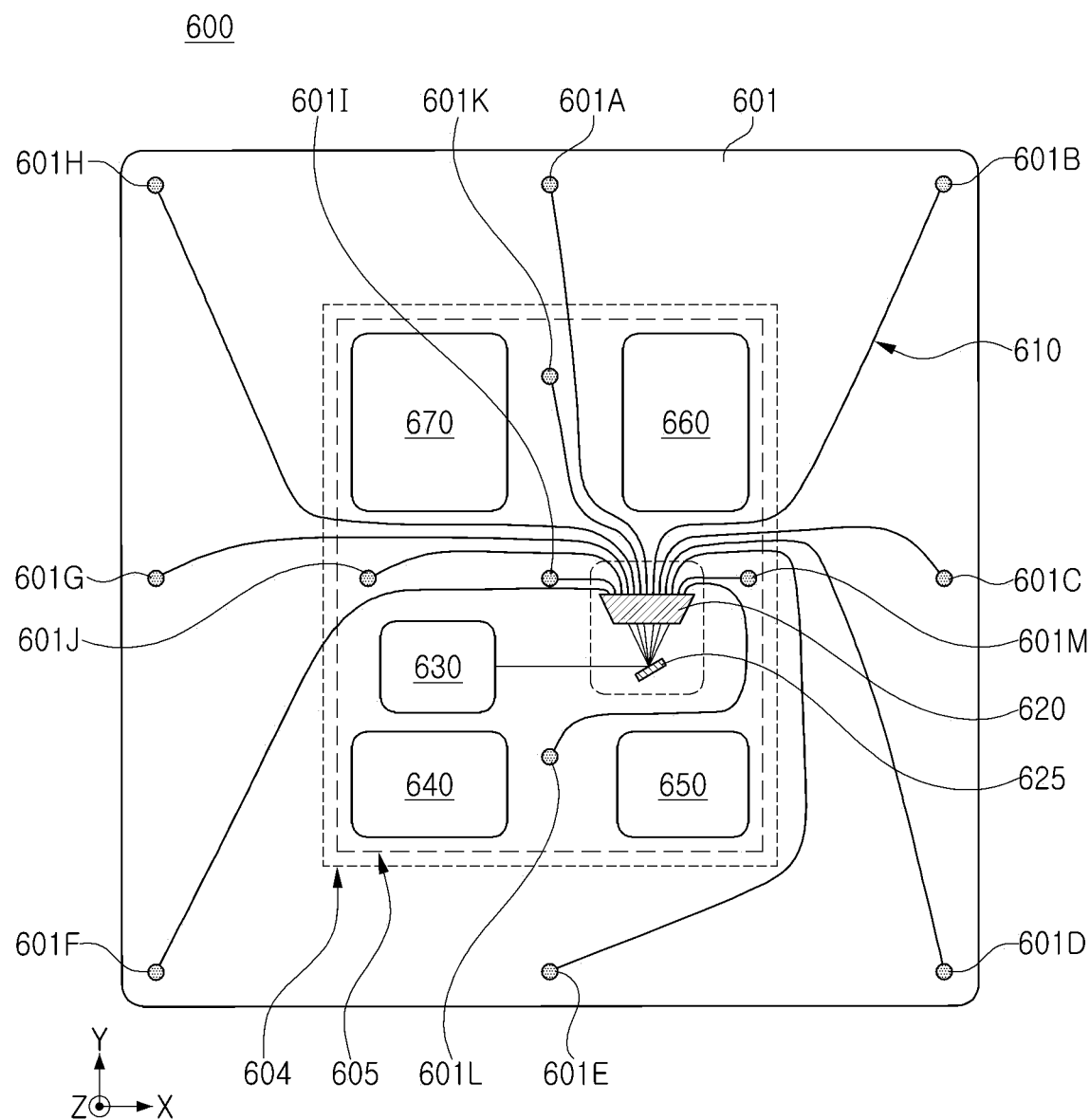
FIG. 12 is a diagram illustrating a sensor device according to some implementations of the present disclosure.

FIG. 12 is a diagram illustrating a sensor device according to some implementations.

Referring to FIG. 12, a sensor device 600 according to some implementations includes a plurality of optical members 610, a selection element 620, a spectrum sensor 630, a controller 640, a wireless communication unit 650, and a power unit 660 and 670. The plurality of optical members 610, the selection element 620, the spectrum sensor 630, the controller 640, the wireless communication unit 650, and the power unit 660 and 670 may be disposed in a space between an upper substrate 601 and a lower substrate disposed side by side with the upper substrate 601.

The upper substrate 601 and the lower substrate may be formed of different materials and may have the same shape as that of a mother substrate for display. The sensor device 600 according to some implementations illustrated in FIG. 12 may be used to adjust control variables of a semiconductor processing apparatus for performing a semiconductor process using plasma on a display mother substrate.

The configuration and the operation of the sensor device 600 and elements thereof is similar to those of the sensor device 300 in the example described above with reference to FIGS. 5, 6A and 6B, except where indicated otherwise. The plurality of light-receiving areas 601A-601M may be formed on the upper substrate 601. The plurality of light-receiving areas 601A-601M may be formed in different positions of the upper substrate 601, such that light emitted from different positions of the plasma formed on the upper substrate 601 may be incident to the plurality of light-receiving areas 601A-601M.

The plurality of light-receiving areas 601A-601M are connected to the plurality of optical members 610, and the plurality of optical members 610 guide light incident to the plurality of light-receiving areas 601A-601M to the selection element 620. The selection element 620 may select the plurality of optical members 610 one by one and may output light guided by the selected optical member to the reflective mirror 625. Light reflected from the reflective mirror 625 may be incident to the spectrum sensor 630, and the spectrum sensor 630 may include an optical detector for detecting intensity of light, and a wavelength selector for selecting light from a predetermined wavelength band on a front end of the optical detector. The wavelength selector may include a plasmonic filter or a grid structure.

Intensities of light detected by the spectrum sensor 630 may be transmitted to the controller 640, and the controller 640 may generate data using the intensities of light detected by the spectrum sensor 630. The controller 640 may be mounted on a circuit substrate 605 together with the selection element 620, the spectrum sensor 630, the wireless communication unit 650, and the power unit 660 and 670, and the circuit substrate 605 may have an area smaller than that of the protective film 60.

Figure 13:
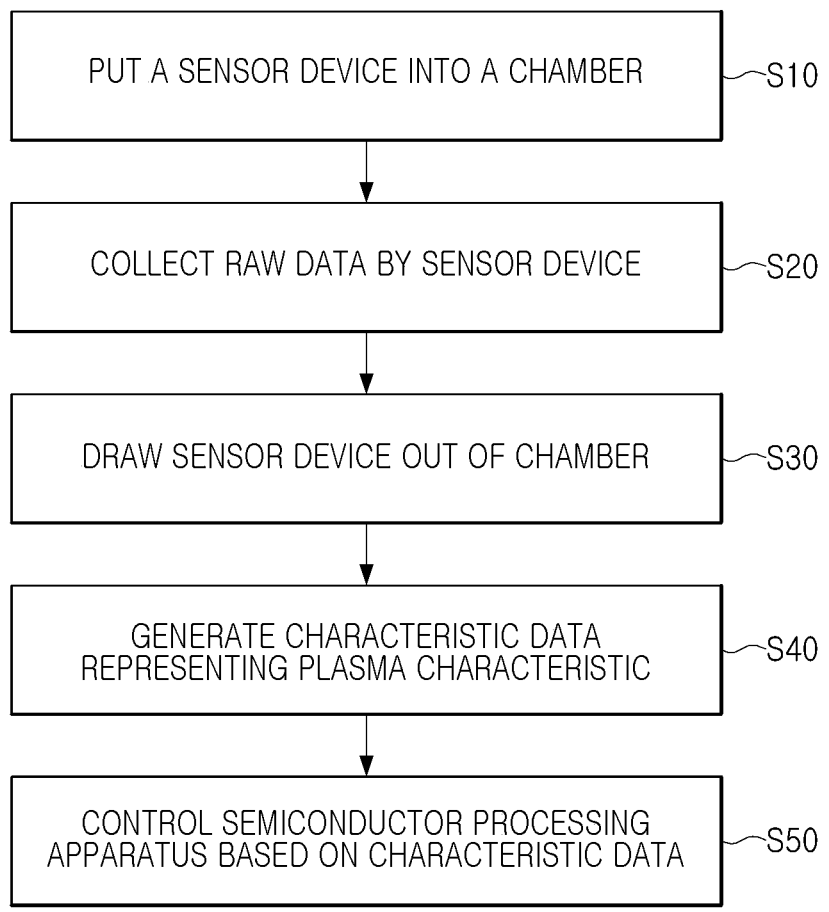
FIG. 13 is a flowchart illustrating operations of a semiconductor processing apparatus according to some implementations of the present disclosure.

FIG. 13 is a flowchart illustrating operations of a semiconductor processing apparatus according to some implementations.

Referring to FIG. 13, an operation of a semiconductor processing apparatus according to some implementations includes putting a sensor device into a chamber (S10). The semiconductor processing apparatus may be configured as a device performing semiconductor processes such as deposition and etching by forming plasma in the space in the chamber. Plasma may be formed on the process target putting into the chamber.

The sensor device may have a structure according to at least one of the examples described above. For example, when a process target put into a semiconductor processing apparatus is a wafer, the sensor device may be implemented as in one or more of the examples described with reference to FIGS. 5, 6A, 6B, 9, and 10. When a process target input into a semiconductor processing apparatus is a display mother substrate, a sensor device may be implemented as in the example described with reference to FIG. 12.

The sensor device put into the chamber may be seated on the electrostatic chuck, and may be fixed to the electrostatic chuck by the chuck voltage supplied to the electrostatic chuck. When the sensor device is fixed to the sensor device, plasma may be formed in the internal space of the chamber of the semiconductor processing apparatus. For example, plasma may be formed by RF power supplied to bias electrodes disposed in a chamber of the semiconductor processing apparatus. In this case, the thickness and density of the plasma may be determined by control variables predetermined for the semiconductor processing apparatus, and the control variables may include RF power, a distance between bias electrodes facing each other vertically in the chamber, and temperature and pressure in the chamber.

When plasma is formed in the inner space of the chamber, the sensor device operates to collect raw data (S20). The sensor device may operate using power supplied by a battery provided therein. While particles such as ions included in plasma are stabilized, light of a specific wavelength band may be emitted, and the wavelength band may vary depending on chemical species. The sensor device may be configured to detect intensities of light emitted from the plasma in a divided manner according to the wavelength band, and intensity of light according to the wavelength band may be generated as raw data.

For example, the sensor device may include a plurality of light-receiving areas (e.g., to receive light from different respective portions of the plasma), and light generated by the plasma and entering the plurality of light-receiving areas may be guided by the plurality of optical members and may be incident to an optical detector. In this case, light of a predetermined wavelength band may be selectively incident to the optical detector by a wavelength selector disposed on a front end of the optical detector. In some implementations, a wavelength selector may select light belonging to a wavelength band of hundreds of nanometers to several micrometers and may allow the light to be incident to the optical detector, and may scatter the light in the wavelength band along the wavelength band and may allow the light to be incident to the optical detector.

When the sensor device completes the collection of raw data, the sensor device is drawn out of the chamber by a transfer robot connected to the semiconductor processing apparatus (S30). The sensor device taken out of the chamber may be mounted on a FOUP and may be transported to another place. In some implementations, while the sensor device is mounted on the FOUP, the sensor device may receive power from the FOUP to perform operations to charge the battery, and/or may transmit the raw data collected in the chamber to the external device through the wireless communication unit in the sensor device. An external device receiving raw data may be configured as a control device for controlling a semiconductor processing apparatus.

The control device receiving the raw data may generate characteristic data representing the thickness and/or density of plasma (S40). In some implementations, the characteristic data may include pieces of image data representing intensities of light emitted from a plasma in a space in the chamber for different positions and/or in different wavelength bands. The control device may analyze the thickness and density of the plasma formed in the chamber using the characteristic data, and may control the semiconductor processing apparatus according to the result thereof (S50). For example, when the density of the plasma is not uniform, the control device may increase or decrease a distance between the bias electrodes in the chamber of the semiconductor processing apparatus.

In some implementations, a sensor device may directly generate characteristic data without transmitting raw data to an external device. For example, the sensor device may generate characteristic data using raw data while being withdrawn from the chamber and accommodated in the FOUP. Alternatively, the sensor device may generate characteristic data using raw data while the FOUP in which the sensor device is accommodated moves to a separate stage. The sensor device may transmit the generated characteristic data to an external control device through a wireless communication unit, and the control device may control the semiconductor processing apparatus by referring to the characteristic data received from the sensor device.

Figure 14:
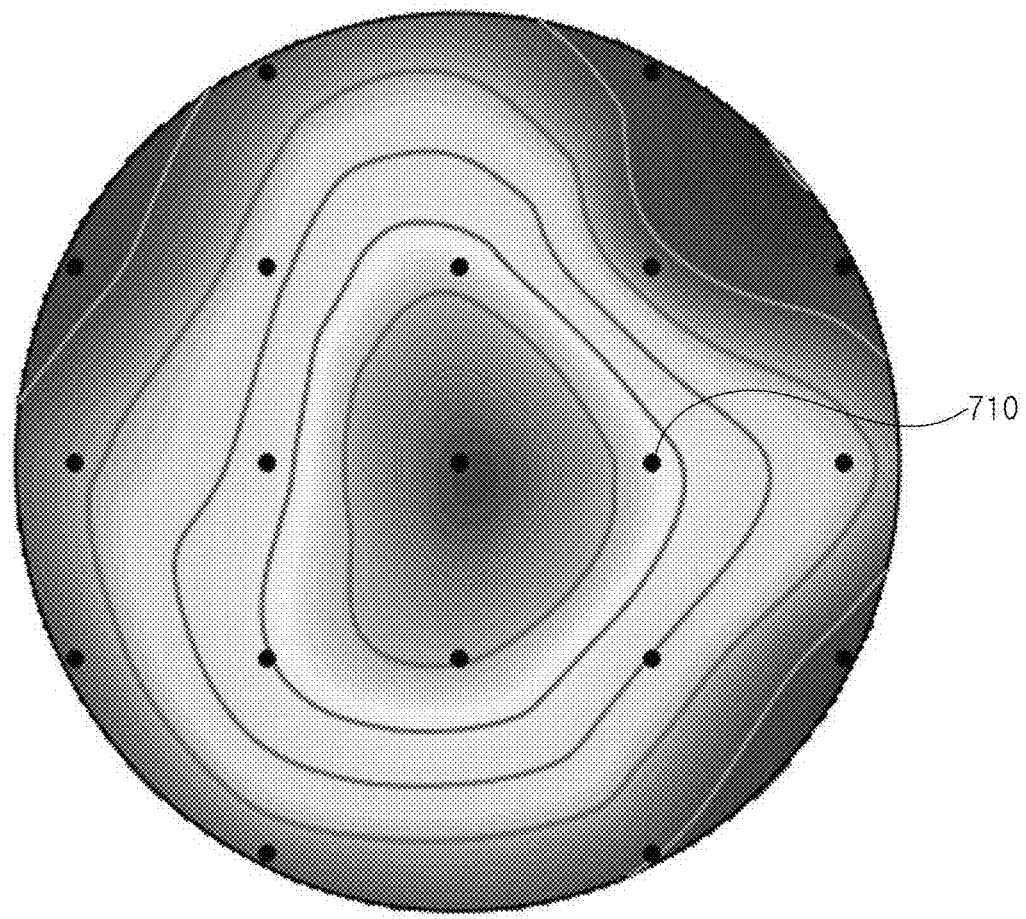
FIG. 14 is a diagram illustrating characteristic data generated by raw data collected by a sensor device according to some implementations of the present disclosure.

FIG. 14 is a diagram illustrating characteristic data generated by raw data collected by a sensor device according to some implementations.

In some implementations illustrated in FIG. 14, characteristic data 700 may be generated in the form of image data. The two-dimensional plane on which the characteristic data 700 is represented may be a plane parallel to an upper surface of the electrostatic chuck on which the sensor device and a process target are seated, and the characteristic data 700 may represent differences in intensity of light corresponding to a specific wavelength band in the form of an image. In some implementations, the characteristic data 700 may be configured as image data generated by intensity of light detected in the plurality of light-receiving areas 710 defined in the sensor device.

Referring to FIG. 14, the closer to the center of the plane parallel to the upper surface of the electrostatic chuck, the stronger the intensity of light may be, and the closer to the outer surface of the plane, the weaker the intensity of light may be. From these characteristic data, it may be determined that the control device controlling the semiconductor processing apparatus may have an uneven distribution of plasma such that plasma may be high in the center of the plasma formed in a space above the electrostatic chuck and low in the periphery thereof. Accordingly, the control device may determine that uniformity of the plasma has deteriorated.

The control device may adjust control variables of the semiconductor processing apparatus based on characteristics such as density of plasma determined by referring to the characteristic data 700. For example, as illustrated in FIG. 14, when it is determined that the density of plasma is high in the center and low in the periphery, the control device may change a distance between bias electrodes provided in the chamber of the semiconductor processing apparatus.

The sensor device inserted into the semiconductor processing apparatus before the semiconductor process is actually performed may collect raw data required to generate the characteristic data 700 as described with reference to FIG. 14 in each of a plurality of wavelength bands. As described above, the wavelength band of light emitted from a plasma may vary depending on chemical species. Accordingly, using the sensor devices described herein, characteristics of various plasmas formed by different types of gases may be analyzed.

The control device may determine characteristics of the plasma including a relative distribution such as that represented by the characteristic data 700, and/or may determine characteristics such as uniformity of plasma by comparing reference data with characteristic data 700 generated in advance in some implementations. For example, by comparing the reference data with the characteristic data 700, it may be determined whether an intensity of light emitted from the plasma is stronger than the reference intensity, and based on the determination, RF power supplied to the semiconductor processing apparatus may be increased or decreased.

Figure 15:
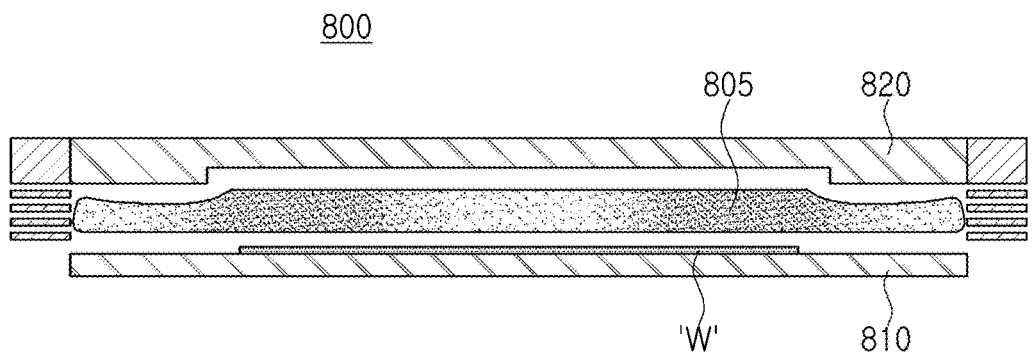
FIGS. 15 to 17 are diagrams illustrating operations of a semiconductor processing apparatus according to some implementations of the present disclosure.
Figure 16:
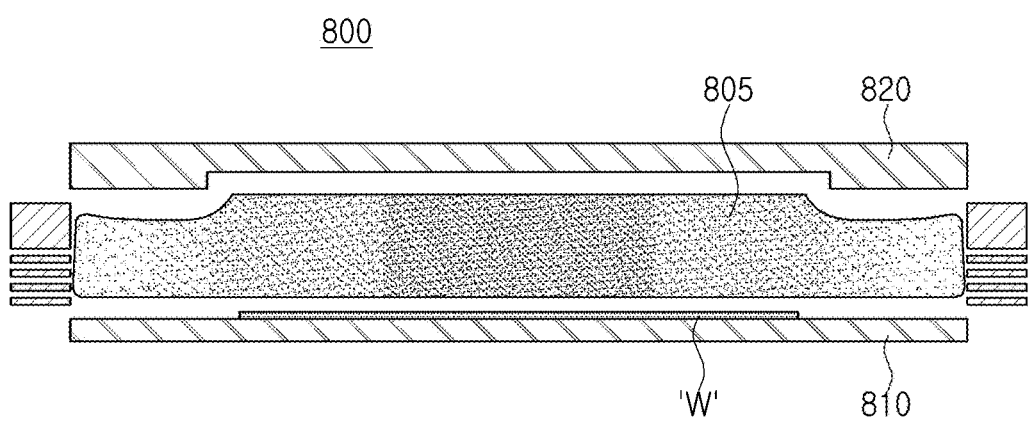
Figure 17:
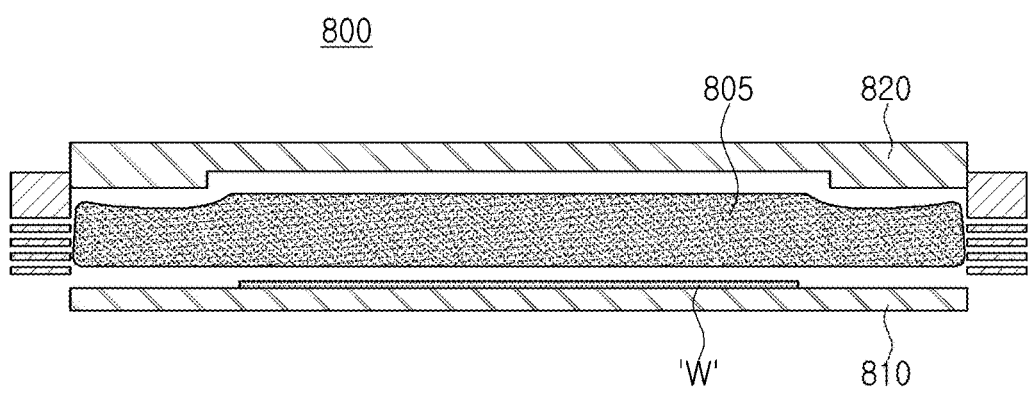

FIGS. 15 to 17 are diagrams illustrating operations of a semiconductor processing apparatus according to some implementations. For example, the operations may be operations in which a control device controlling the semiconductor processing apparatus may control the semiconductor processing apparatus 800 with reference to characteristic data. The characteristic data referred to by the control device may be generated by raw data obtained by collecting light emitted from the plasma by the sensor device put into the semiconductor processing apparatus 800 before actually performing the semiconductor process using the plasma in the semiconductor processing apparatus 800.

Referring to FIGS. 15 to 17, the semiconductor processing apparatus 800 includes a first bias electrode 810 and a second bias electrode 820, and a plasma 805 may be generated in a space therebetween. The plasma 805 may be formed on a wafer W, which may be a process target.

FIG. 15 is a diagram illustrating an example in which a distance between the first bias electrode 810 and the second bias electrode 820 is relatively small. When the distance between the first bias electrode 810 and the second bias electrode 820 is relatively small, density of the plasma 805 may be formed unevenly. As an example, referring to FIG. 15, in the space above the wafer W, the density of plasma 805 may appear low in the center and the periphery, and the density of plasma 805 may appear high in the space therebetween.

FIG. 16 is a diagram illustrating an example in which a distance between the first bias electrode 810 and the second bias electrode 820 is relatively large. As the distance between the first bias electrode 810 and the second bias electrode 820 increases, the density of the plasma 805 may appear higher toward the center of the wafer W and may appear smaller toward the periphery.

FIG. 17 is a diagram illustrating an example in which a distance between the first bias electrode 810 and the second bias electrode 820 is set appropriately. In the example illustrated in FIG. 17, density of plasma 805 may appear evenly in the space above the wafer W. As described with reference to FIGS. 15 to 17, density of the plasma 805 may vary depending on positions in the space above the wafer W according to the distance between the first bias electrode 810 and the second bias electrode 820.

In some implementations, by putting the sensor device instead of the wafer W and forming the plasma 805 before performing the actual semiconductor process by putting in the wafer W, it may be determined whether the distance between the first bias electrode 810 and the second bias electrode 820 is properly determined. As described above, the sensor device may collect intensity of light emitted from different positions in the space in which the plasma 805 may be formed as raw data.

Accordingly, as illustrated in FIG. 15, when the distance between the first bias electrode 810 and the second bias electrode 820 is determined, the intensity of light may be detected as small in a position close to the center of the sensor device, and may be detected as high in a position close to the periphery of the sensor device. As illustrated in FIG. 16, when the distance between the first bias electrode 810 and the second bias electrode 820 is determined, the intensity of light may be detected as high in a position close to the center of the sensor device, and intensity of light may be detected as small in a position close to the periphery of the sensor device.

The control device of the semiconductor processing apparatus may adjust the distance between the first bias electrode 810 and the second bias electrode 820 by referring to intensities of light detected by the sensor device from a plurality of positions. For example, when the intensity of light is detected as relatively higher in positions closer to the center of the sensor device, the control device may lower the position of the second bias electrode 820 to reduce the distance between the first bias electrode 810 and the second bias electrode 820. Also, when the intensity of light is detected as relatively higher in positions close to the periphery of the sensor device, the control device may increase the position of the second bias electrode 820 to increase the distance between the first bias electrode 810 and the second bias electrode 820. By adjusting the distance between the first bias electrode 810 and the second bias electrode 820 based on intensity of light collected by the sensor device as described above, the plasma 805 may be formed with a uniform density as illustrated in FIG. 17 during the actual semiconductor process by putting in the wafer W.

According to the aforementioned implementations, a sensor device having (in some implementations) the same shape as that of a process target such as a wafer, mask, and/or a mother substrate for display may be provided, and the sensor device may be put into the semiconductor processing apparatus. The sensor device may include a plurality of optical members, and sensors for collecting and processing light generated from a plurality of positions. The sensor device obtains raw data through which the thickness and density of plasma actually formed in the semiconductor processing apparatus may be accurately determined, and based on the determination, control variables of the semiconductor processing apparatus to form plasma with the desired thickness and density may be determined. Accordingly, yield in an actual semiconductor process may be improved.

While this specification contains many specific implementation details, these should not be construed as limitations on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

While certain examples have been illustrated and described above, it will be configured as apparent to those skilled in the art that modifications and variations may be made without departing from the scope of the appended claims.

What is claimed is:

1. A sensor device, comprising:
  a lower substrate;
  an upper substrate disposed on the lower substrate and including a light-receiving area;
  an optical member disposed in a space between the lower substrate and the upper substrate, the optical member including
    a light-receiving optical system configured to receive light entering the light-receiving area and reflect the received light in a direction parallel to an upper surface of the lower substrate, and
    a light guide configured to guide light reflected from the light-receiving optical system;
  a selection element disposed in the space, the selection element configured to selectively output light guided by the light guide of the optical member; and
  a spectrum sensor disposed in the space, the spectrum sensor including a wavelength selector and an optical detector,
  wherein the spectrum sensor is configured to provide light in a wavelength band, from the light output by the selection element, to the optical detector,
  wherein the optical detector is configured to detect an intensity of the light in the wavelength band, and
  wherein the wavelength selector includes at least one of a plasmonic filter or a grid structure.

2. The sensor device of claim 1, wherein the wavelength selector includes the plasmonic filter,
  wherein the plasmonic filter includes a plurality of filter regions configured to selectively transmit light in different wavelength bands, and
    wherein the plurality of filter regions are arranged in one direction parallel to an upper surface of the upper substrate.

3. The sensor device of claim 2, wherein the plurality of filter regions are disposed above the optical detector.

4. The sensor device of claim 2, wherein the spectrum sensor includes a reflective mirror configured to
  receive the light output by the selection element, wherein the light output by the selection element is traveling in a direction parallel to the upper surface of the upper substrate, and
  reflect the light received at the reflective mirror in a direction perpendicular to the upper surface of the upper substrate, to allow the reflected light to be incident to the plurality of filter regions.

5. The sensor device of claim 2,
  wherein each of the plurality of filter regions includes
  an upper layer including silicon and a lower layer including silicon, and
  a metal layer disposed between the upper layer and the lower layer,
  wherein respective patterns of the metal layer in at least some of the plurality of filter regions have different shapes.

6. The sensor device of claim 1, wherein the wavelength selector includes the grid structure,
  wherein the spectrum sensor includes a first mirror configured to reflect light output by the optical member and direct the light output by the optical member to the grid structure, and a second mirror configured to reflect light separated by the grid structure, and
  wherein the optical detector includes a linear image sensor.

7. The sensor device of claim 6, wherein the first mirror is configured as a collimating mirror, and the second mirror is configured as a focusing mirror.

8. The sensor device of claim 1, comprising:
  a controller configured to control the selection element and the spectrum sensor and to generate data including the intensity of the light in the wavelength band;
  a wireless communication unit configured to provide communication between the controller and an external device; and
  a power unit configured to supply power to the selection element, the spectrum sensor, the controller, and the wireless communication unit.

9. The sensor device of claim 8, comprising:
  a circuit substrate on which are mounted the selection element, the spectrum sensor, the controller, the wireless communication unit, and the power unit, the circuit substrate disposed on the upper surface of the lower substrate.

10. The sensor device of claim 9, comprising:
  a first protective film disposed between the lower substrate and the circuit substrate; and
  a second protective film attached to a lower surface of the upper substrate,
  wherein an area of the first protective film is larger than an area of the circuit substrate.

11. The sensor device of claim 10, wherein the light-receiving area is a first light-receiving area of a plurality of light-receiving areas included in the upper substrate, and
  wherein a first subset of the plurality of light-receiving areas is non-overlapping with the second protective film in a direction perpendicular to an upper surface of the upper substrate, and
  wherein a second subset of the plurality of light-receiving areas overlaps the first protective film in the direction perpendicular to the upper surface of the upper substrate.

12. The sensor device of claim 8, wherein the power unit includes one or more batteries configured to supply power to the selection element, the spectrum sensor, the controller, and the wireless communication unit, and
  a wireless charger unit configured to charge the one or more battery.

13. The sensor device of claim 12, wherein the one or more batteries includes a plurality of batteries disposed in different positions in a direction parallel to an upper surface of the upper substrate.

14. The sensor device of claim 1, wherein the wavelength band is within a range of 200 nm to 3 um.

15. A sensor device, comprising:
  a lower substrate;
  an upper substrate disposed on the lower substrate, formed of a material different from a material of the lower substrate, and including a plurality of light-receiving areas disposed in different positions;
  a plurality of optical members disposed between the lower substrate and the upper substrate and configured to provide a traveling path of light generated in a plasma formed in a space above the upper substrate and entering the plurality of light-receiving areas;
  a spectrum sensor configured to detect intensities of light in a wavelength band received through each of the plurality of optical members; and
  a controller configured to generate data including intensities of light in the wavelength band corresponding to each of the plurality of light-receiving areas.

16. The sensor device of claim 15, wherein the controller is configured to generate image data representing a uniformity of the plasma in a space above the upper substrate using the intensities of light in the wavelength band corresponding to each of the plurality of light-receiving areas.

17. The sensor device of claim 15,
wherein the plurality of light-receiving areas include a first light-receiving area and a second light-receiving area disposed in different positions on the upper substrate,
wherein the plurality of optical members include a first optical member connected to the first light-receiving area and a second optical member connected to the second light-receiving area,
wherein the first optical member is connected to a first wavelength selector configured to filter light entering the first light-receiving area in a first wavelength band and a first optical detector configured to detect an intensity of light output by the first wavelength selector, and
wherein the second optical member is connected to a second wavelength selector configured to filter light entering the second light-receiving area in a second wavelength band different from the first wavelength band and a second optical detector configured to detect an intensity of light output by the second wavelength selector.

18. The sensor device of claim 15, comprising:
a circuit substrate on which the spectrum sensor and the controller are mounted, the circuit substrate and attached to a lower surface of the upper substrate or an upper surface of the lower substrate,
wherein an area of the circuit substrate is smaller than an area of each of the upper substrate and the lower substrate.

19. A sensor device, comprising:
a lower substrate;
an upper substrate disposed on the lower substrate and including a plurality of light-receiving areas disposed in different positions;
a plurality of optical members disposed between the lower substrate and the upper substrate and configured to provide a traveling path of light generated in a plasma formed in a space above the upper substrate and entering the plurality of light-receiving areas;
an optical detector configured to detect intensity of light received through each of the plurality of optical members; and
a controller configured to generate data including the intensity of light.

20. The sensor device of claim 19, further comprising:
a wavelength selector connected to the optical detector and configured to select a wavelength band of the light received through each of the plurality of optical members.

* * * * *